United States Patent
Shaikh et al.

(10) Patent No.: US 9,094,839 B2
(45) Date of Patent: Jul. 28, 2015

(54) EVOLVED PACKET CORE (EPC) NETWORK ERROR MAPPING

(71) Applicant: Verizon Patent and Licensing Inc., Basking Ridge, NJ (US)

(72) Inventors: Imtiyaz Shaikh, Irving, TX (US); Javier M. Lopez, Alameda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 159 days.

(21) Appl. No.: 13/724,288

(22) Filed: Dec. 21, 2012

(65) Prior Publication Data

US 2013/0242754 A1 Sep. 19, 2013

Related U.S. Application Data

(63) Continuation-in-part of application No. 13/432,324, filed on Mar. 28, 2012.

(60) Provisional application No. 61/610,304, filed on Mar. 13, 2012.

(51) Int. Cl.
*H04W 24/04* (2009.01)
*H04W 24/00* (2009.01)
*H04W 92/04* (2009.01)

(52) U.S. Cl.
CPC .............. *H04W 24/00* (2013.01); *H04W 24/04* (2013.01); *H04W 92/04* (2013.01)

(58) Field of Classification Search
None
See application file for complete search history.

(56) References Cited

U.S. PATENT DOCUMENTS

| | | | |
|---|---|---|---|
| 6,879,812 B2 * | 4/2005 | Agrawal et al. | 455/67.11 |
| 6,996,111 B1 * | 2/2006 | Benayoun et al. | 370/397 |
| 7,068,597 B1 | 6/2006 | Fijolek et al. | |
| 7,388,834 B2 | 6/2008 | Naik et al. | |
| 7,936,683 B2 * | 5/2011 | Qiu et al. | 370/242 |
| 8,027,265 B2 | 9/2011 | Chu et al. | |
| 8,422,373 B2 | 4/2013 | Alanara | |
| 8,428,610 B2 | 4/2013 | Chowdhury et al. | |
| 8,457,098 B2 | 6/2013 | Yang et al. | |
| 8,498,202 B2 * | 7/2013 | Kanode et al. | 370/225 |
| 8,503,992 B2 | 8/2013 | Pehrsson et al. | |
| 8,566,455 B1 | 10/2013 | Zhao et al. | |
| 2002/0077110 A1 | 6/2002 | Ishikawa et al. | |
| 2005/0144272 A1 * | 6/2005 | Herzberg | 709/224 |
| 2006/0007954 A1 * | 1/2006 | Agrawal et al. | 370/466 |
| 2007/0127420 A1 * | 6/2007 | Tjandra | 370/338 |
| 2008/0163007 A1 * | 7/2008 | Shaeffer et al. | 714/52 |
| 2008/0239944 A1 * | 10/2008 | Golla et al. | 370/216 |
| 2008/0261565 A1 * | 10/2008 | Kunz et al. | 455/414.1 |
| 2008/0263398 A1 * | 10/2008 | Mori et al. | 714/25 |
| 2009/0052322 A1 | 2/2009 | Simonsson et al. | |

(Continued)

Primary Examiner — Ian N Moore
Assistant Examiner — Lakeram Jangbahadur

(57) ABSTRACT

A first node device, associated with an evolved packet core network, receives an error code from a second node device associated with the evolved packet core network, where the error code is destined for a user equipment. The first node device compares the error code to information included in a data structure that maps multiple error codes to multiple translated error codes understood by the user equipment, and translates the error code into a translated error code based on the comparing of the error code to the information included in the data structure. The translated error code is in a format that is understood by the user equipment. The first node device provides the translated error code to the user equipment or to a third node device associated with the evolved packet core network.

20 Claims, 8 Drawing Sheets

(56) References Cited

U.S. PATENT DOCUMENTS

| | | |
|---|---|---|
| 2010/0149986 A1 | 6/2010 | Johnson et al. |
| 2011/0202604 A1 | 8/2011 | Craig et al. |
| 2011/0252123 A1 | 10/2011 | Sridhar et al. |
| 2011/0252477 A1 | 10/2011 | Sridhar et al. |
| 2011/0256856 A1 | 10/2011 | Rydneil et al. |
| 2012/0002541 A1 | 1/2012 | Lee |
| 2012/0044836 A1 | 2/2012 | Sivavakeesar et al. |
| 2012/0069733 A1 | 3/2012 | Ye et al. |
| 2012/0140632 A1 | 6/2012 | Norp et al. |
| 2012/0173661 A1 | 7/2012 | Mahaffey et al. |
| 2012/0215851 A1 | 8/2012 | Wu et al. |
| 2012/0269061 A1 | 10/2012 | Kekki |
| 2012/0302244 A1 | 11/2012 | Sridhar et al. |
| 2013/0044596 A1 | 2/2013 | Zhi et al. |
| 2013/0121282 A1 | 5/2013 | Liu |
| 2013/0163424 A1 | 6/2013 | Goerke et al. |
| 2013/0176975 A1 | 7/2013 | Turanyi et al. |
| 2013/0201832 A1 | 8/2013 | Kang et al. |

* cited by examiner

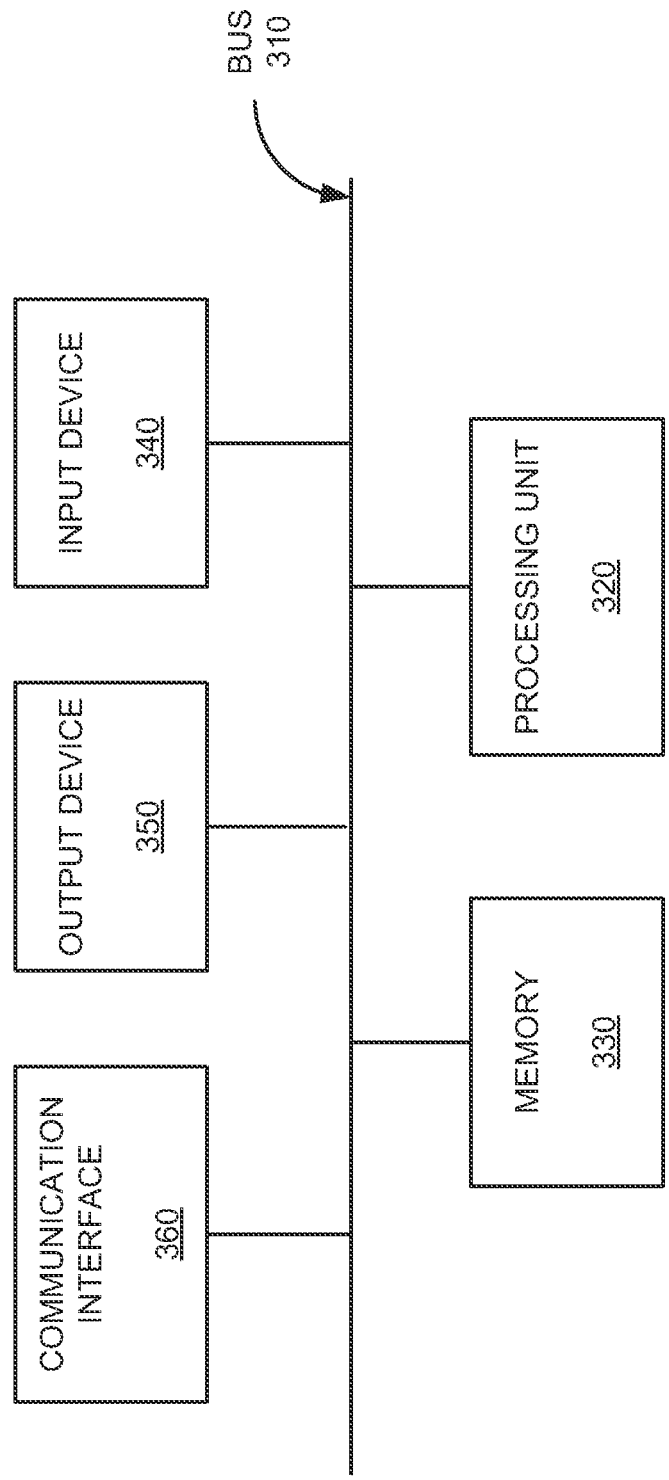

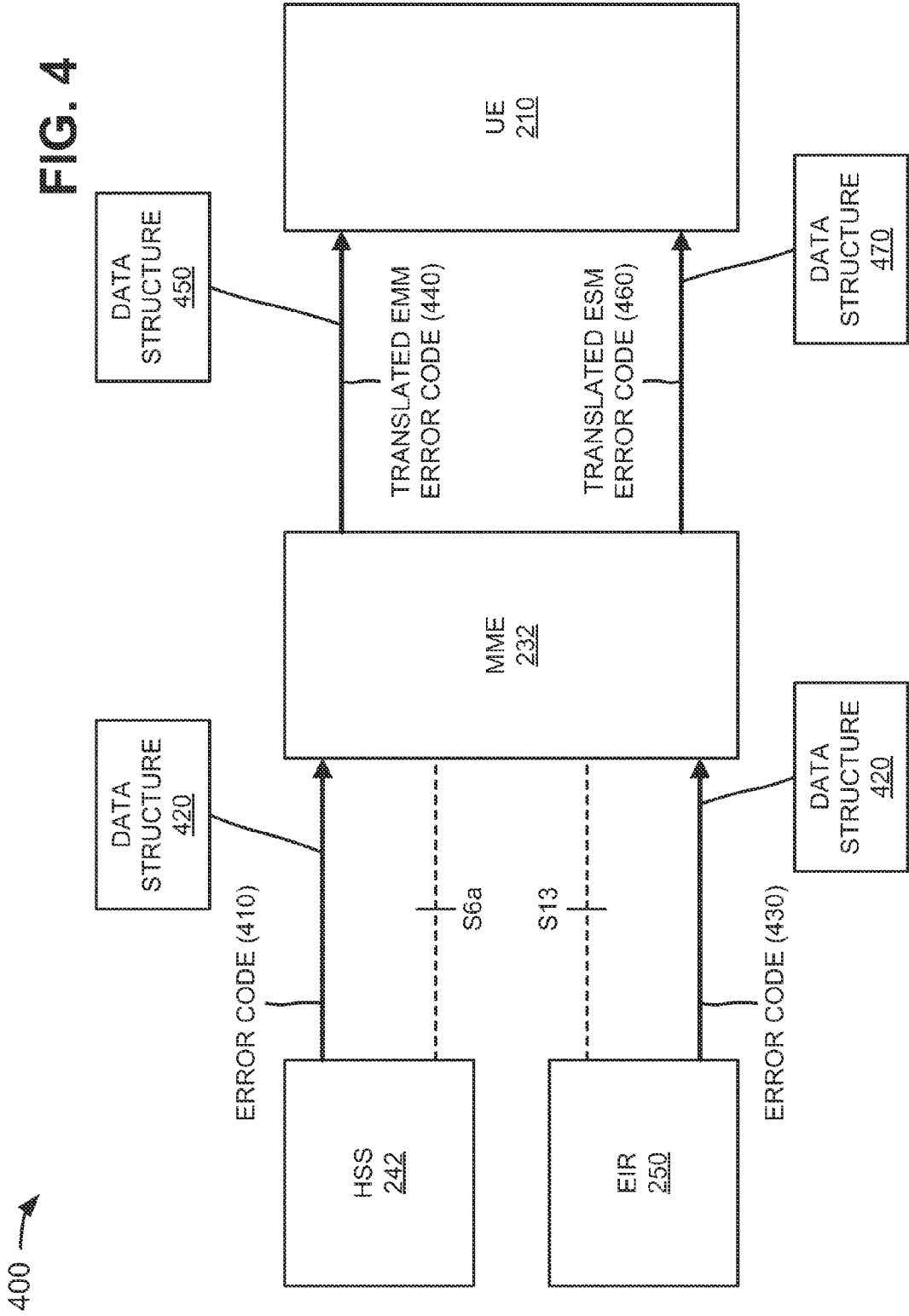

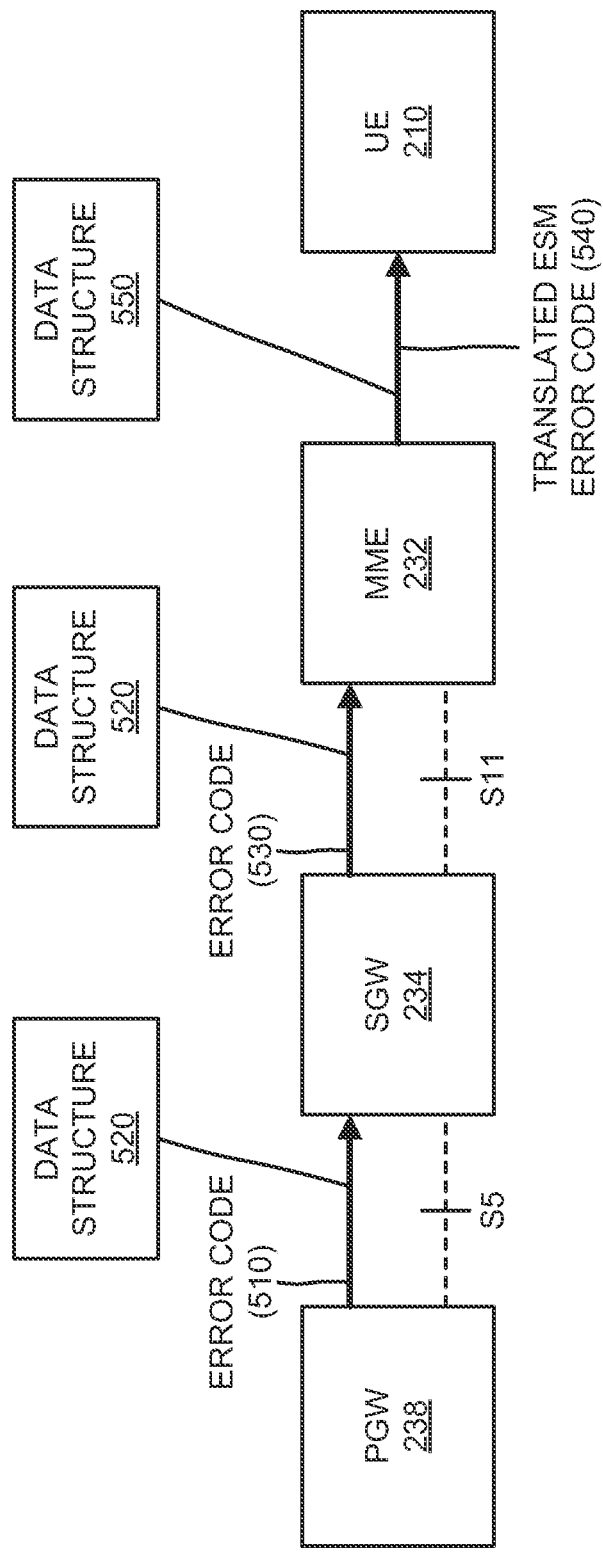

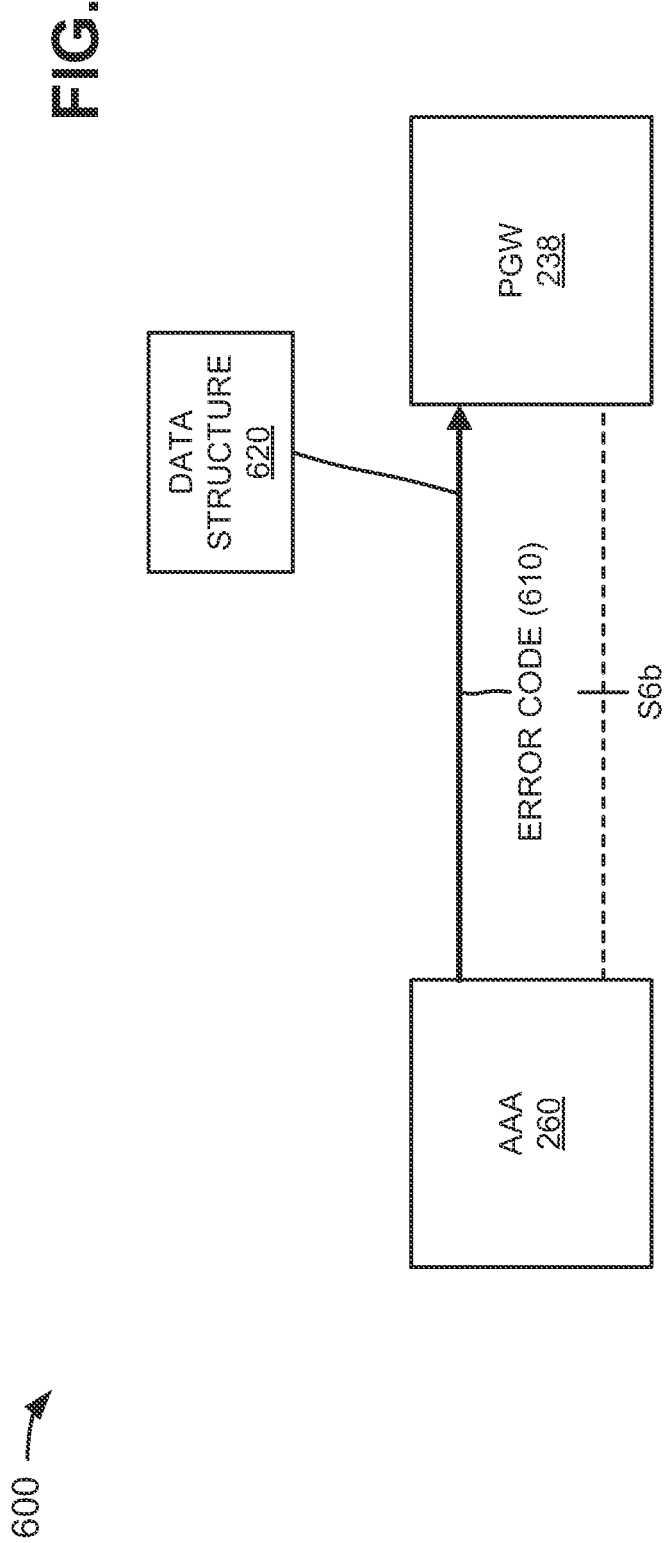

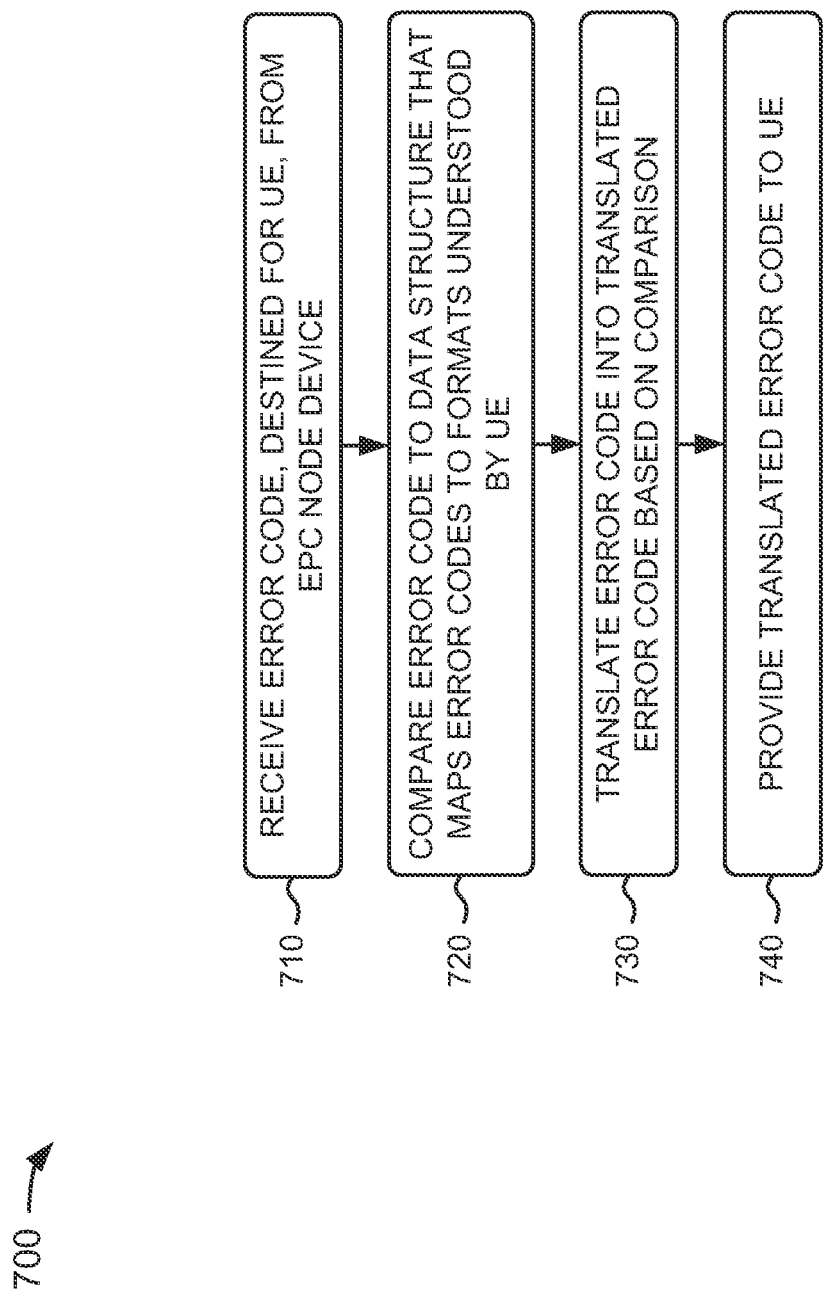

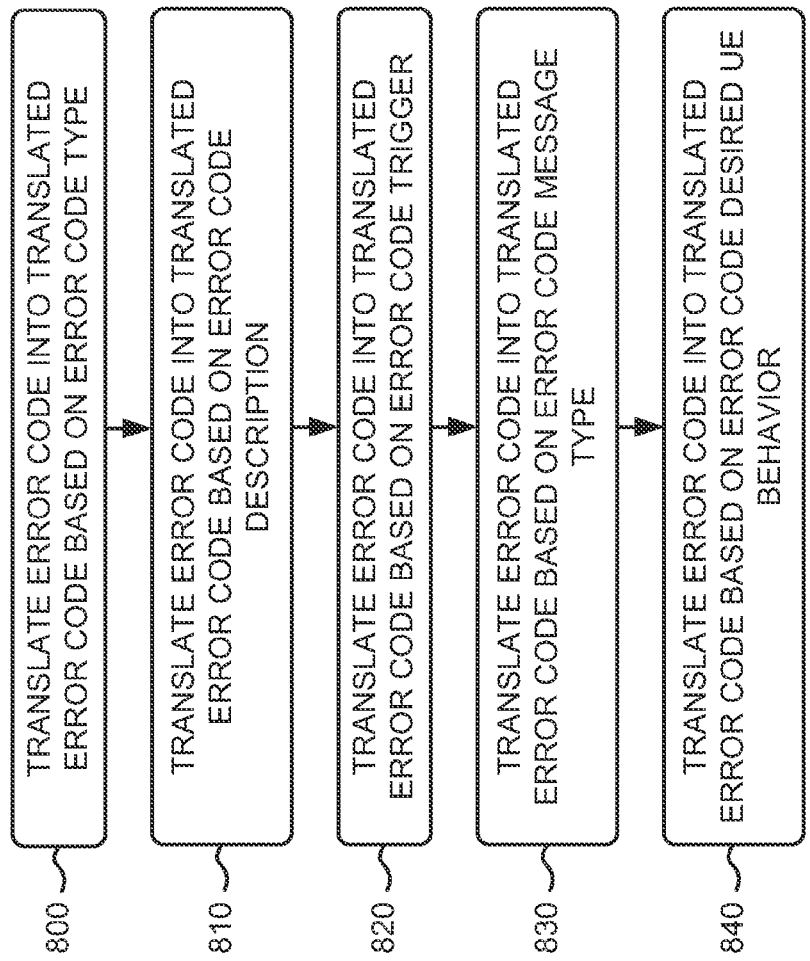

EVOLVED PACKET CORE (EPC) NETWORK ERROR MAPPING

RELATED APPLICATIONS

This application is a continuation-in-part of U.S. patent application Ser. No. 13/432,324, filed Mar. 28, 2012, which claims priority, under 35 U.S.C. §119, to U.S. Provisional Patent Application Ser. No. 61/610,304, filed Mar. 13, 2012. The entire contents of U.S. patent application Ser. No. 13/432,324 and U.S. Provisional Patent Application Ser. No. 61/610,304 are hereby incorporated by reference.

BACKGROUND

In the Third Generation Partnership Project (3GPP), the fourth generation (4G) cellular network includes a radio access network (e.g., referred to as a long term evolution (LTE) network) and a wireless core network (e.g., referred to as evolved packet core (EPC) network). The LTE network is often called an evolved universal terrestrial radio access network (E-UTRAN). The EPC network is an all-Internet protocol (IP) packet-switched core network that supports high-speed wireless and wireline broadband access technologies. The EPC network allows user equipment (UEs) to access various services by connecting to the LTE network, an evolved high rate packet data (eHRPD) radio access network (RAN), and/or a wireless local area network (WLAN) RAN. The EPC network is a complex system that includes a number of network nodes that communicate with each other when UEs are accessing the EPC network. An evolved packet system (EPS) is defined to include both the LTE and EPC networks. EPS seeks to improve mobile technology through higher bandwidth, better spectrum efficiency, wider coverage, enhanced security, and full interworking with other access networks.

A network outage of the EPC network may be catastrophic to a telecommunications provider. For example, if both active and redundant packet data network (PDN) gateways (PGWs) of the EPC network fail, hundreds of thousands of UEs may be disconnected from the EPC network at the same time. Such a situation may create a tsunami-like event where all of the disconnected UEs attempt to reconnect to the EPC network at the same time and create a message surge that eventually overloads a re-authentication and reauthorization device (e.g., a home subscriber server (HSS)) of the EPC network. Authentication is one of the first steps that is performed when UEs are attempting to connect to the EPC network. The connecting UEs send signaling to mobility management entities (MMEs) of the EPC network, and the MMEs, in turn, send the signaling to the HSS for authentication of the UEs. During a message surge, MMEs may be able to sustain the large amount of UEs sending authentication requests at the same time. The HSS, however, may not be able to handle the large amount of authentication requests and may become overloaded. Once the HSS is overloaded, the connecting UEs may not receive service and connected UEs may lose service.

The 4G version of the EPC network may include network nodes that require significantly less space and power requirements than second generation (2G) circuit switched network nodes. The 4G network nodes may be designed to handle millions of UEs while occupying a small amount of space. However, standardization of the 4G version of the EPC network did not consider failure scenarios, such as the example scenario presented above. Thus, the 4G version of the EPC network remains susceptible to catastrophic network failures.

BRIEF DESCRIPTION OF THE DRAWINGS

FIG. 3 is a diagram of example components of a device that may correspond to one or more of the devices of the environment depicted in FIG. 2;

FIG. 4 is a diagram of example interactions among components of an example portion of the environment depicted in FIG. 2;

FIG. 5 is a diagram of example interactions among components of another example portion of the environment depicted in FIG. 2;

FIG. 6 is a diagram of example interactions among components of still another example portion of the environment depicted in FIG. 2; and FIGS. 7 and 8 are flow charts of an example process for mapping error codes in an EPC network according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide mechanisms to prevent failures in an EPC network. In one example, the systems and/or methods may provide mechanisms (e.g., data structures) that enable network nodes of the EPC network to translate or map error codes into a format that is understandable by a MME of the EPC network and/or by UEs connected to the MME.

Figure 1:
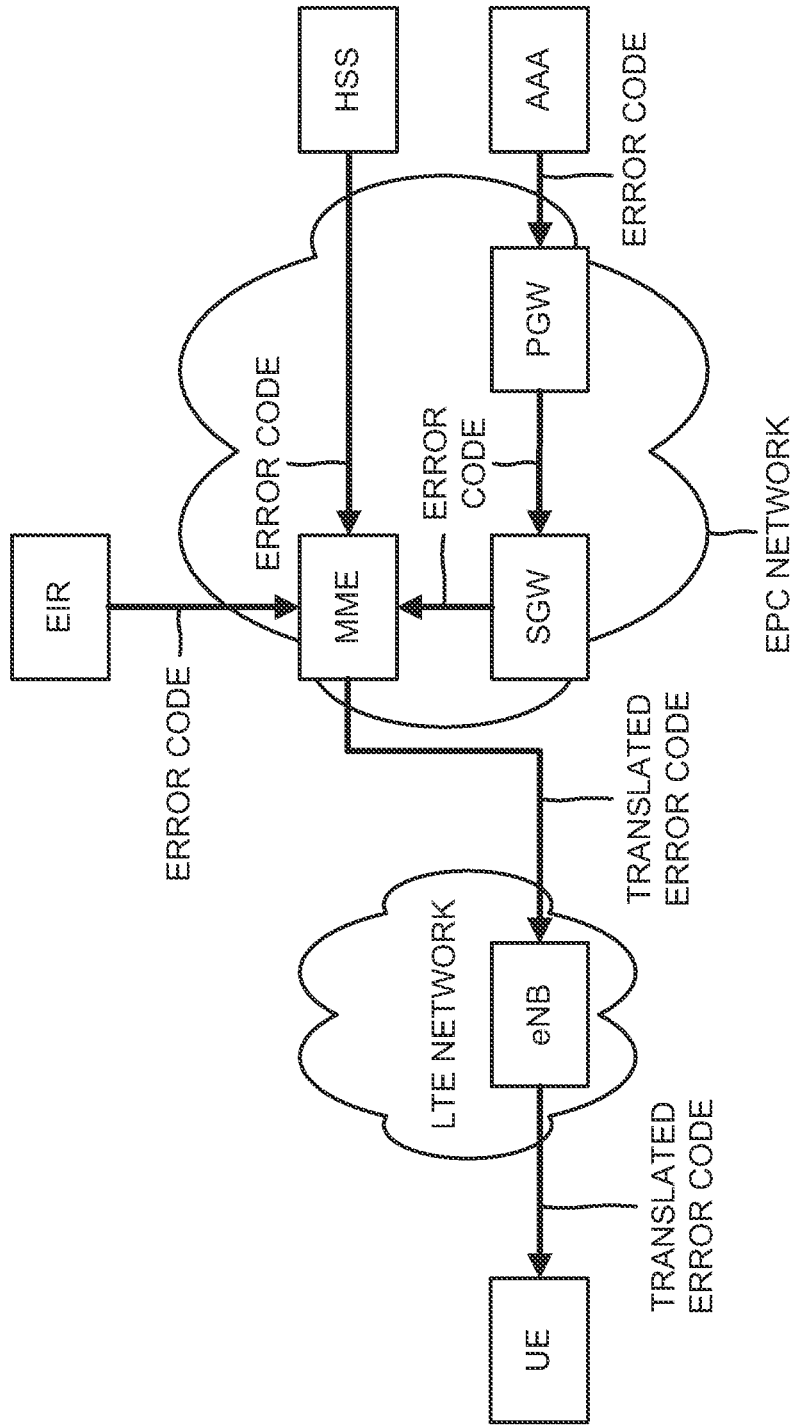
FIG. 1 is a diagram of an overview of an example implementation described herein.

FIG. 1 is a diagram of an overview of an example implementation described herein. As shown in FIG. 1, an EPS may include a UE, a LTE network, and an EPC network. The LTE network may include an eNodeB (eNB). The EPC network may include a variety of network nodes, such as, for example, a MME, a serving gateway (SGW), and a PGW. An equipment identity register (EIR) and a HSS may connect with the MME, and an authentication, authorization, and accounting (AAA) server may connect to the PGW.

The UE may include a radiotelephone, a personal communications system (PCS) terminal, a smart phone, a personal digital assistant (PDA), a laptop computer, a tablet computer, a desktop computer, a workstation computer, a personal computer, a landline telephone, etc. The LTE network may include a communications network that connects subscribers (e.g., the UE) to a service provider. The eNB may enable traffic to be communicated between the UE and the MME and/or the SGW.

The EPC network may include a core network architecture of the 3GPP LTE wireless communication standard. The MME may be responsible for idle mode tracking and paging procedures (e.g., including retransmissions) for the UE. The MME may be involved in a bearer activation/deactivation process (e.g., for the UE) and may choose a SGW for the UE at an initial attach and at a time of intra-LTE handover. The SGW may route and forward traffic, may act as a mobility anchor for a user plane during inter-eNB handovers, and may act as an anchor for mobility between LTE and other 3GPP technologies. The PGW may provide connectivity of the UE to external packet data networks by being a traffic exit/entry point for the UE.

The EIR may store a list of mobile devices (e.g., identified by an international mobile station equipment identity (IMEI)) that are to be monitored and/or banned from a network. The HSS may include a master user database that supports devices of an IP Multimedia Subsystem (IMS) network, that handle calls. The AAA server may perform AAA operations associated with a communication session with the UE.

In one example implementation, one or more the network nodes of the EPC network (e.g., the MME, the SGW, the PGW, the EIR, the HSS, and/or the AAA) may generate an error code that is eventually provided to the UE. For example, during a network outage, the network nodes may generate error codes that may be eventually provided to the MME. For example, the EIR and the HSS may provide error codes directly to the MME. The AAA server may provide an error code to the MME, via the PGW and the SGW. The error codes may attempt to deny connection requests from the UE and other UEs (not shown in FIG. 1) due to the network outage. In one example, the error codes may instruct the UEs to not attempt to connect to the EPC network for a particular period of time or until the UEs perform a power cycle.

The network nodes interfacing with the UE and the other UEs (e.g., the eNB and the MME) may provide the error codes to the UE and the other UEs. However, due to the variety of interfaces associated with the network nodes, the error codes may not be understood by the MME and/or the UEs. In one example implementation, data structures may be provided that define how the error codes at each network node are translated or mapped so that the error codes may be understood by the MME and/or the UEs. For example, as shown in FIG. 1, the MME may utilize the data structures to translate an error code (e.g., received from the EIR, the HSS, or the SGW) into a translated error code that may be understood by the UE. The MME may provide the translated error code to the eNB, and the eNB may provide the translated error code to the UE.

The term "traffic," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "user" and "subscriber" are intended to be broadly interpreted to include a UE, or a user of a UE.

Figure 2:
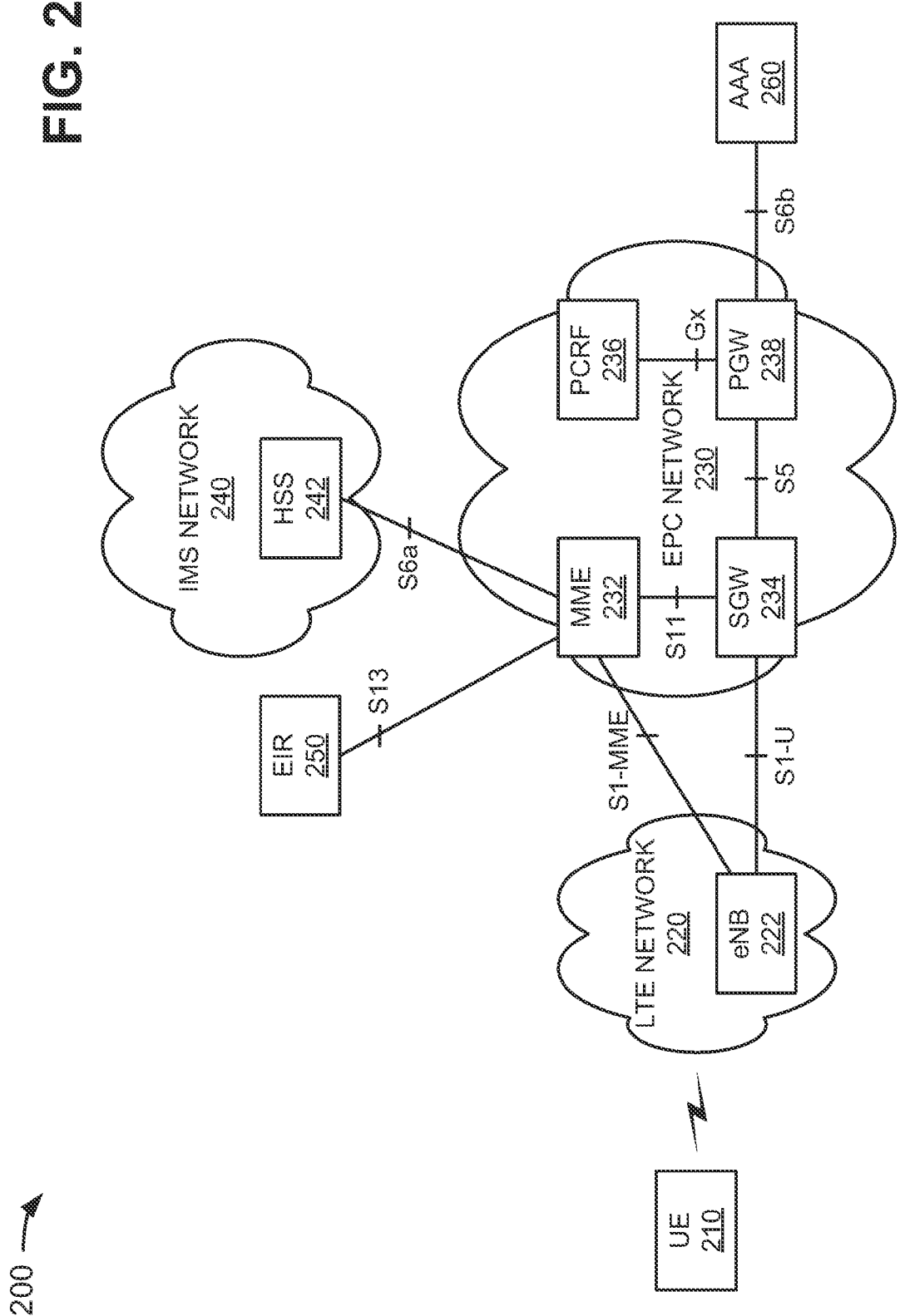
FIG. 2 is a diagram of an example environment in which systems and/or methods described herein may be implemented.

FIG. 2 is a diagram of an example environment 200 in which systems and/or methods described herein may be implemented. As illustrated, environment 200 may include a UE 210, a LTE network 220, an EPC network 230, an IMS network 240, an EIR 250, and an AAA server 260. LTE network 220 may include an eNB 222. EPC network 230 may include a MME 232, a SGW 234, a policy and charging rule function (PCRF) 236, and a PGW 238. IMS network 240 may include a HSS 242. Devices/networks of environment 200 may interconnect via wired and/or wireless connections.

As further shown in FIG. 2, eNB 222 may interface with MME 232 over a S1-MME interface, and may interface with SGW 234 over a S1-U interface. MME 232 may interface with SGW 234 over a S11 interface, may interface with HSS 242 over a S6 a interface, and may interface with EIR 250 over a S13 interface. SGW 234 may interface with PGW 238 over a S5 interface. PCRF 236 may interface with PGW 238 over a Gx interface. PGW 238 may interface with AAA server 260 over a S6 b interface. Other interfaces not shown in FIG. 2 may also be utilized by devices of LTE network 220, EPC network 230, and/or IMS network 240. For example, multiple MMEs 232 may interface with one another over S10 interfaces.

UE 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; or other types of computation and communication devices. In an example implementation, UE 210 may include a device that is capable of communicating over LTE network 220, EPC network 230, and/or IMS network 240.

LTE network 220 may include a communications network that connects subscribers (e.g., UE 210) to a service provider. In one example, LTE network 220 may include a WiFi network or other access networks (e.g., an E-UTRAN or an enhanced high-rate packet data (eHRPD) network). Alternatively, or additionally, LTE network 220 may include a radio access network capable of supporting high data rate, low latency, packet optimization, large capacity and coverage, etc.

eNB 222 may include one or more computation and communication devices that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include a core network architecture of the 3GPP LTE wireless communication standard. In one example, EPC network 230 may include an all-IP packet-switched core network that supports high-speed wireless and wireline broadband access technologies. In another example, EPC network 230 may provide packet-switched voice services (e.g., which are traditionally circuit-switched) using IMS network 240.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attach and at a time of intra-LTE handover. MME 232 may authenticate UE 210 (e.g., via interaction with HSS 242). Non-access stratum (NAS) signaling may terminate at MME 232 and MME 232 may generate and allocate temporary identities to UEs (e.g., UE 210). MME 232 may check authorization of UE 210 to camp on a service provider's Public Land Mobile Network (PLMN) and may enforce roaming restrictions for UE 210. MME 232 may be a termination point in EPC network 230 for ciphering/integrity protection for NAS signaling and may handle security key management. MME 232 may provide a control plane function for mobility between LTE and access networks with a S3 interface terminating at MME 232. MME 232 may also terminate a S6a interface towards HSS 242 for roaming UEs.

SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 234 may route and forward user data packets, may act as a mobility anchor for a user plane during inter-eNB handovers, and may act as an anchor for mobility between LTE and other 3GPP technologies. For idle state UEs 210, SGW 234 may terminate a downlink (DL) data path and may trigger paging when DL data arrives for UE 210. SGW 234 may manage and store contexts associated with UE 210 (e.g., parameters of an IP bearer service, network internal routing information, etc.).

PCRF 236 may include one or more computation and communication devices that may provide policy control decision and flow based charging control functionalities. PCRF 236 may provide network control regarding service data flow detection, gating, quality of service (QoS) and flow based charging, etc. PCRF 236 may determine how a certain service data flow shall be treated, and may ensure that user plane traffic mapping and treatment is in accordance with a user's subscription profile.

PGW 238 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 238 may provide connectivity of UE 210 to external packet data networks by being a traffic exit/entry point for UE 210. UE 210 may simultaneously connect to more than one PGW for accessing multiple PDNs. PGW 238 may perform policy enforcement, packet filtering for each user, charging support, lawful intercept, and packet screening. PGW 238 may also act as an anchor for mobility between 3GPP and non-3GPP technologies.

IMS network 240 may include an architectural framework or network (e.g., a telecommunications network) for delivering IP multimedia services.

HSS 242 may include one or more computation and communication devices that gather, process, search, and/or provide information in a manner described herein. In one example implementation, HSS 242 may include a master user database that supports devices of IMS network 240 that handle calls. HSS 242 may include subscription-related information (e.g., subscriber profiles), and may provide information about a subscriber's location and IP information.

EIR 250 may include one or more computation and communication devices that gather, process, search, and/or provide information in a manner described herein. In one example implementation, EIR 250 may store a list of UEs 210 that are to be monitored or banned from EPC network 230. The information stored in EIR 250 may not change in real time, and may include information that prevents calls from stolen, unauthorized, or defective UEs 210. EIR 250 may receive information associated with attempts to access EPC network 230, and may store the information in a log file.

AAA server 260 may include one or more computation and communication devices that gather, process, search, and/or provide information in a manner described herein. In one example implementation, AAA server 260 may provide authentication, authorization, and accounting services for UE 210. With regard to authentication, AAA server 260 may verify an identifier (e.g., a mobile directory number (MDN), a mobile identification number (MIN), a mobile equipment identity (MEID), an IMEI, etc.) and credentials (e.g., passwords, tokens, digital certificates, etc.) associated with UE 210. With regard to authorization, AAA server 260 may grant or refuse privileges to UE 210 for accessing specific services. With regard to accounting, AAA server 260 may track consumption of network resources by UE 210.

Although FIG. 2 shows example devices/networks of environment 200, in other implementations, environment 200 may include fewer devices/networks, different devices/networks, differently arranged devices/networks, or additional devices/networks than depicted in FIG. 2. Alternatively, or additionally, one or more devices/networks of environment 200 may perform one or more other tasks described as being performed by one or more other devices/networks of environment 200.

FIG. 3 is a diagram of example components of a device 300 that may correspond to one or more of the devices of environment 200. In one example implementation, one or more of the devices of environment 200 may include one or more devices 300 or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a touch screen display, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of environment 200.

As described herein, device 300 may perform certain operations in response to processing unit 320 executing software instructions contained in a computer-readable medium, such as memory 330. A computer-readable medium may be defined as a non-transitory memory device. A memory device may include memory space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a diagram of example interactions among components of an example portion 400 of environment 200 (FIG. 2). As shown, example environment portion 400 may include UE 210, MME 232, HSS 242, and EIR 250. UE 210, MME 232, HSS 242, and EIR 250 may include the features described above in connection with, for example, one or more of FIGS. 1-3.

As further shown in FIG. 4, HSS 242 may provide an error code 410 to MME 232 via the S6a interface. In one example, error code 410 may be defined by a data structure 420 associated with the S6a interface. Data structure 420 may include, for example, a table used to define error standards for the S6a interface. In one example implementation, data structure 420 may include the information provided in Table 1.

TABLE 1

Error Standards For S6a/S13 Interfaces

| Code Class | Diameter Code | Code Description | Trigger |
| --- | --- | --- | --- |
| P | 5423 | DIAMETER_ERROR_UNKNOWN_SERVING_NODE | Sent by the HSS to indicate that a Notify command has been received from a serving node which is not registered in HSS as the node currently serving the user |
| N/A | N/A | N/A | N/A |
| N/A | N/A | N/A | N/A |
| S | 2001 | S13 Case - DIAMETER_SUCCESS | UE is listed in the EIR as "blacklisted" |
| P | 5420 | DIAMETER_ERROR_UNKNOWN_EPS_SUBSCRIPTION with Error Diagnostic of NO_GPRS_DATA_SUBSCRIBED | Sent by the HSS to indicate that the EPS subscription is unknown |
| P | 5001 | DIAMETER_ERROR_USER_UNKNOWN | Sent by the HSS to indicate that the user identified by the User Name is unknown |
| S | 2001 | DIAMETER_SUCCESS All packet oriented services barred | Policy set in HSS |
| S | 2001 | DIAMETER_SUCCESS Roamer access H-PLMN AP barred | Policy set in HSS |
| S | 2001 | DIAMETER_SUCCESS Roamer access V-PLMN AP barred | Policy set in HSS |
| N/A | N/A | N/A | N/A |
| N/A | N/A | N/A | N/A |
| P | 5004 | DIAMETER_ERROR_ROAMING_NOT_ALLOWED | The HSS sends this result-code to indicate that the subscriber is not allowed to roam within the MME. |
| N/A | N/A | N/A | N/A |
| N/A | N/A | N/A | N/A |
| S | 2001 | DIAMETER_SUCCESS Roaming Restricted | Roaming restricted due to unsupported feature in ULA included by the HSS |
| P | 5421 | DIAMETER_ERROR_RAT_NOT_ALLOWED | Sent by the HSS to indicate the RAT type the UE is using is not allowed for the IMSI |
| P | 5420 | DIAMETER_ERROR_UNKNOWN_EPS_SUBSCRIPTION without Error Diagnostic, or with Error Diagnostic of GPRS_DATA_SUBSCRIBED | Sent by the HSS to indicate that no EPS subscription is associated with the IMSI |
| P | 5003 | DIAMETER_AUTHORIZATION_REJECTED | Sent by HSS if user could not be authorized. This error could occur if the service requested is not permitted to the user. This is triggered by HSS if user is mis-provisioned e.g. SIM provisioned instead of USIM |
| N/A | N/A | N/A | N/A |
| P | 5012 | DIAMETER_UNABLE_TO_COMPLY | Sent by HSS when the rejection reason is unspecified |

TABLE 1-continued

Error Standards For S6a/S13 Interfaces

| Code Class | Diameter Code | Code Description | Trigger |
|---|---|---|---|
| P | 5012 | DIAMETER_UNABLE_TO_COMPLY | Sent by HSS when the rejection reason is unspecified |
| P | 5004 (Result Code) | DIAMETER_INVALID_AVP_VALUE | Sent when HSS receives an invalid AVP value |
| P | 5004 (Result Code) | DIAMETER_INVALID_AVP_VALUE | Sent when HSS receives an invalid AVP value |
| P | 5422 | S13 Case DIAMETER_ERROR_EQUIPMENT_UNKNOWN | Sent by the EIR to indicate that the mobile equipment is not listed in the EIR |
| T | 4181 | DIAMETER_AUTHENTICATION_DATA_UNAVAILABLE | Sent by the HSS to indicate that an unexpectedly transient failure occurs. Request can be retried again in the future |
| Pro | 3004 | DIAMETER_TOO_BUSY | Sent by HSS when the server is too busy and an alternative node should be attempted by source |
| Pro | 3004 | DIAMETER_TOO_BUSY | Sent by HSS when the server is too busy and an alternative node should be attempted by source |
| Pro | 3002 | DIAMETER_UNABLE_TO_DELIVER | Sent if peer node is unreachable or if message could not be delivered to the peer node. Sent by AAA if HSS is not responding |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| Pro | 3001 (Result Code) | DIAMETER_COMMAND_UNSUPPORTED | The Diameter command sent by the MME is not supported by HSS and returns this result code |
| Pro | 3002 (Result Code) | DIAMETER_UNABLE_TO_DELIVER | This is sent when a Diameter Routing issue occurs. |
| Pro | 3003 (Result Code) | DIAMETER_REALM_NOT_SERVED | This is sent per RFC 3588 when the Diameter Realm AVP is not present, or is present with a value not configured in HSS. |
| Pro | 3004 (Result Code) | DIAMETER_TOO_BUSY | HSS sends this when it's under temporary overload. |
| Pro | 3005 (Result Code) | DIAMETER_LOOP_DETECTED | Diameter Routing Loop detected by HSS. |
| Pro | 3006 (Result Code) | DIAMETER_REDIRECT_INDICATION | Not sent by HSS. |
| Pro | 3007 (Result Code) | DIAMETER_APPLICATION_UNSUPPORTED | HSS received a request being to an application other than S6a. |
| Pro | 3008 (Result Code) | DIAMETER_INVALID_HDR_BITS | Per RFC 3588, HSS received a request with invalid combination of bits in the Diameter header. |
| Pro | 3009 (Result Code) | DIAMETER_INVALID_AVP_BITS | Per RFC 3588, HSS received a request with an AVP code with |

TABLE 1-continued

Error Standards For S6a/S13 Interfaces

| Code Class | Diameter Code | Code Description | Trigger |
|---|---|---|---|
| | | | invalid combination of bits. |
| Pro | 3010 (Result Code) | DIAMETER_UNKNOWN_PEER | HSS received certificate (CER) from unknown peer. |
| T | 4001 (Result Code) | DIAMETER_AUTHENTICATION_REJECTED | Not sent by HSS |
| T | 4002 (Result Code) | DIAMETER_OUT_OF_SPACE | HSS sends this when it's under temporary overload. |
| T | 4003 (Result Code) | ELECTION_LOST | Not sent by HSS |
| P | 5001 (Result Code) | DIAMETER_AVP_UNSUPPORTED | HSS received a mandatory AVP code that is not supported. |
| P | 5002 (Result Code) | DIAMETER_UNKNOWN_SESSION_ID | Not applicable for S6a. |
| P | 5005 (Result Code) | DIAMETER_MISSING_AVP | HSS didn't receive an AVP code that is required. |
| P | 5006 (Result Code) | DIAMETER_RESOURCES_EXCEEDED | Not sent by HSS |
| P | 5007 (Result Code) | DIAMETER_CONTRADICTING_AVPS | HSS received a request containing AVP codes that contradict with each other. |
| P | 5008 (Result Code) | 65 | HSS received an AVP code that must not be present. |
| P | 5009 (Result Code) | DIAMETER_AVP_OCCURS_TOO_MANY_TIMES | HSS received an AVP code too many times. |
| P | 5010 (Result Code) | DIAMETER_NO_COMMON_APPLICATION | HSS received a CER request for an application other than S6a, Cx/Dx, Sh/Dh, SWx. |
| P | 5011 (Result Code) | DIAMETER_UNSUPPORTED_VERSION | Per RFC 3588. |
| P | 5012 (Result Code) | DIAMETER_UNABLE_TO_COMPLY | HSS is unable to generate the requested vectors due to an internal temporary error. |
| P | 5013 (Result Code) | DIAMETER_INVALID_BIT_IN_HEADER | HSS received a request with an invalid bit set to 1 in the header. |
| P | 5014 (Result Code) | DIAMETER_INVALID_AVP_LENGTH | HSS received a request with AVP code length set to an invalid value. |
| P | 5015 (Result Code) | DIAMETER_INVALID_MESSAGE_LENGTH | HSS received a request with message length set to an invalid value. |
| P | 5016 (Result Code) | DIAMETER_INVALID_AVP_BIT_COMBO | HSS received a request containing an AVP code with which is not allowed to have the given value in the AVP code flags field. |
| P | 5017 (Result Code) | DIAMETER_NO_COMMON_SECURITY | Not sent by HSS as no Diameter security is used. |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |

As shown in Table 1, data structure 420 may include a code class column, a Diameter code column, a code description column, a trigger column, and a variety of entries associated with the columns. The code class column may provide classes for the Diameter codes identified in the Diameter code column. The classes may include, for example, a permanent (P) class, a transient (T) class, a protocol (Pro) class, a success (S) class, an informational (I) class, and/or no class (N/A). The Diameter code column may include Diameter codes generated in accordance with the Diameter protocol. For example, Diameter code "5423" may indicate that a serving node is unknown to HSS 242.

The code description column may include a description associated with a Diameter code listed in the Diameter code column. For example, Diameter code "5001" may indicate (e.g., in the code description column) that a user (e.g., associated with UE 210) is unknown to HSS 242. The trigger column may include information describing why a particular Diameter code is generated. For example, the trigger column may state that HSS 242 sends Diameter code "5004" to indicate that a subscriber (e.g., associated with UE 210) is not allowed to roam within MME 232.

Although Table 1 shows example information that may be included in data structure 420, in other implementations, data structure 420 may include less information, different information, differently arranged information, or more information than depicted in Table 1.

In one example implementation, Table 1 may be replaced with or used in addition to the information provided in Table 2.

TABLE 2

Additional Error Standards For S6a/S13 Interfaces

| Result Code Family | Diameter Code | Code Description | Trigger | MME Error behavior | Retry alternate HSS | MME sends NAS Error |
|---|---|---|---|---|---|---|
| 1XXX | 1001 | DIAMETER_MULTI_ROUND_AUTH | Not sent by HSS. | #17 Network Failure | N | #17 Network Failure |
| 2XXX | 2001 | DIAMETER_SUCCESS | Various | Success | Success | Success |
|  | 2002 | DIAMETER_LIMITED_SUCCESS | Not sent by HSS. | Success | Success | not sure |
| 3XXX | 3001 | DIAMETER_COMMAND_UNSUPPORTED | Diameter command sent by the MME is not supported by HSS and returns this RC | #17 Network Failure | N | #17 Network Failure |
|  | 3002 | DIAMETER_UNABLE_TO_DELIVER | This is sent when a Diameter Routing issue occurs. | #17 Network Failure | N | #15 No suitable cells in tracking area; provisionable option supported to change NAS cause |
|  | 3003 | DIAMETER_REALM_NOT_SERVED | This is sent when the Diameter Realm AVP is not present, or is present with a value not configured in HSS. | #17 Network Failure (in inter PLMN case this is a permanent error). No retry towards alternate HSS | N | #15 No suitable cells in tracking area; provisionable option supported to change NAS cause |
|  | 3004 | DIAMETER_TOO_BUSY | HSS sends this when it's under temporary overload. | #17 Network Failure | Y | #17 Network Failure |
|  | 3005 | DIAMETER_LOOP_DETECTED | Diameter Routing Loop detected by HSS. | #17 Network Failure (loops are potential resource hogs so retry may | N | #17 Network Failure |

TABLE 2-continued

Additional Error Standards For S6a/S13 Interfaces

| Result Code Family | Diameter Code | Code Description | Trigger | MME Error behavior | Retry alternate HSS | MME sends NAS Error |
|---|---|---|---|---|---|---|
| | 3006 | DIAMETER_REDIRECT_INDICATION | Not sent by HSS. | be dangerous but it is possible) #17 Network Failure (redirect info currently ignored) | N | #17 Network Failure |
| | 3007 | DIAMETER_APPLICATION_UNSUPPORTED | HSS received a request to an application other than S6a. | #17 Network Failure | N | #17 Network Failure |
| | 3008 | DIAMETER_INVALID_HDR_BITS | Per RFC 3588, HSS received a request with invalid combination of bits in the Diameter header. | #17 Network Failure | N | #17 Network Failure |
| | 3009 | DIAMETER_INVALID_AVP_BITS | Per RFC 3588, HSS received a request with an AVP with invalid combination of bits. | #17 Network Failure | N | #17 Network Failure |
| | 3010 | DIAMETER_UNKNOWN_PEER | HSS received CER from unknown peer. | #17 Network Failure | N | #17 Network Failure |
| 4XXX | 4001 | DIAMETER_AUTHENTICATION_REJECTED | Not sent by HSS | #17 Network Failure (4001 is used for password errors, but is not applicable to S6a). HSS provides security vectors that are | N | #15 No suitable cells in tracking area; provisionable option supported to change NAS cause |

TABLE 2-continued

Additional Error Standards For S6a/S13 Interfaces

| Result Code Family | Diameter Code | Code Description | Trigger | MME Error behavior | Retry alternate HSS | MME sends NAS Error |
|---|---|---|---|---|---|---|
| | 4002 | DIAMETER_OUT_OF_SPACE | HSS sends this when it's under temporary overload. | #17 Network Failure | Y | #17 Network Failure |
| | 4003 | ELECTION_LOST | Not sent by HSS | #17 Network Failure | N | #17 Network Failure |
| 5XXX | 5001 | DIAMETER_AVP_UNSUPPORTED | HSS received a mandatory AVP that is not supported. | #17 Network Failure | N | #8 EPS service and non-EPS service not allowed (don't distinguish this from the DIAMETER_ERROR_USER_UNKNOWN). |
| | 5001 | DIAMETER_ERROR_USER_UNKNOWN | HSS is not provisioned with the user IMSI. | #8 EPS services and non-EPS services not allowed | N | #8 EPS service and non-EPS service not allowed; provisionable option supported to change NAS cause |
| | 5002 | DIAMETER_UNKNOWN_SESSION_ID | Not applicable for S6a. | #17 Network Failure | N | #17 Network Failure |
| | 5003 | DIAMETER_AUTHORIZATION_REJECTED | Sent by HSS if user could not be authorized. This error could occur if the service requested is not permitted to the user. | #15 "No suitable cells in tracking area" | N | #15 No suitable cells in tracking area; provisionable option supported to change NAS cause |
| | 5004 | DIAMETER_INVALID_AVP_VALUE | HSS received an AVP with an invalid value. | #17 Network Failure | N | #11 PLMN Not allowed; provisionable option supported to change NAS |

TABLE 2-continued

Additional Error Standards For S6a/S13 Interfaces

| Result Code Family | Diameter Code | Code Description | Trigger | MME Error behavior | Retry alternate HSS | MME sends NAS Error |
|---|---|---|---|---|---|---|
| | 5004 | DIAMETER_ERROR_ROAMING_NOT_ALLOWED | The HSS sends this result-code to indicate that the subscriber is not allowed to roam within the MME. | #14 EPS services not allowed in this PLMN | N | #11 PLMN Not allowed; provisionable option supported to change NAS cause (we don't distinguish this from DIAMETER_ERROR_ROAMING_NOT_ALLOWED) |
| | 5005 | DIAMETER_MISSING_AVP | HSS didn't receive an AVP that is required. | #17 Network Failure | N | #17 Network Failure |
| | 5006 | DIAMETER_RESOURCES_EXCEEDED | Not sent by HSS | #17 Network Failure. Note this is a UE expending all its resources NOT the node. Does not really apply to S6a (this is a AAA code) | N | #17 Network Failure |
| | 5007 | DIAMETER_CONTRADICTING_AVPS | HSS received a request containing AVPs that contradict with each other. | #17 Network Failure | N | #17 Network Failure |
| | 5008 | DIAMETER_AVP_NOT_ALLOWED | HSS received an AVP that must not be present. | #17 Network Failure | N | #17 Network Failure |
| | 5009 | DIAMETER_AVP_OCCURS_TOO_MANY_TIMES | HSS received an AVP too many times. | #17 Network Failure | N | #17 Network Failure |
| | 5010 | DIAMETER_NO_COMMON_APPLICATION | HSS received a CER request for an application other than S6a, | #17 Network Failure | N | #17 Network Failure |

TABLE 2-continued

Additional Error Standards For S6a/S13 Interfaces

| Result Code Family | Diameter Code | Code Description | Trigger | MME Error behavior | Retry alternate HSS | MME sends NAS Error |
|---|---|---|---|---|---|---|
| | | | Cx/Dx, Sh/Dh, SWx. | | | |
| | 5011 | DIAMETER_UNSUPPORTED_VERSION | Per RFC 3588. | #17 Network Failure | N | #17 Network Failure |
| | 5012 | DIAMETER_UNABLE_TO_COMPLY | HSS is unable to generate the requested vectors due to an internal temporary error. | #17 Network Failure | N | #17 Network Failure; provisionable option supported to change NAS cause |
| | 5013 | DIAMETER_INVALID_BIT_IN_HEADER | HSS received a request with an invalid bit set to 1 in the header. | #17 Network Failure | N | #17 Network Failure |
| | 5014 | DIAMETER_INVALID_AVP_LENGTH | HSS received a request with AVP length set to an invalid value. | #17 Network Failure | N | #17 Network Failure |
| | 5015 | DIAMETER_INVALID_MESSAGE_LENGTH | HSS received a request with message length set to an invalid value. | #17 Network Failure | N | #17 Network Failure |
| | 5016 | DIAMETER_INVALID_AVP_BIT_COMBO | HSS received a request containing an AVP with which is not allowed to have the given value in the AVP Flags field. | #17 Network Failure | N | #17 Network Failure |
| | 5017 | DIAMETER_NO_COMMON_SECURITY | Not sent by HSS as no Diameter security is used. | #17 Network Failure | N | #17 Network Failure |
| | 5420 | DIAMETER_ERROR_UNKNOWN_EPS_SUBSCRIPTION without Error Diagnostic, or with Error Diagnostic of GPRS_DATA_SUBSCRIBED | The HSS sends this response when user IMSI is known to the HSS, but the user has no EPS subscription. | #15 "No suitable cells in tracking area" | N | #15 No suitable cells in tracking area; provisionable option supported to change NAS cause (we don't look at |

TABLE 2-continued

Additional Error Standards For S6a/S13 Interfaces

| Result Code Family | Diameter Code | Code Description | Trigger | MME Error behavior | Retry alternate HSS | MME sends NAS Error |
|---|---|---|---|---|---|---|
| | | | | | | error diagnostic) |
| | 5420 | DIAMETER_ERROR_UNKNOWN_EPS_SUBSCRIPTION with Error Diagnostic of NO_GPRS_DATA_SUBSCRIBED | Not in EPS 2.0 | #7 "EPS services not allowed" | N | #15 No suitable cells in tracking area; provisionable option supported to change NAS cause (we don't look at error diagnostic) |
| | 5421 | DIAMETER_ERROR_RAT_NOT_ALLOWED | The HSS sends this result-code to indicate that the radio access technology (RATs) type used by the UE is not allowed for the IMSI. | #15 | N | #15 No suitable cells in tracking area; provisionable option supported to change NAS cause (we don't look at error diagnostic) |
| | None | | Message timeout | | #17 Network Failure | Y | #17 Network Failure |

Table 2 may include a result code family column, a Diameter code column, a code description column, a trigger column, a MME error behavior column, a retry alternate HSS column, a MME sends NAS error column, and a variety of entries associated with the columns. The result code family column may provide families (e.g., 1XXX, 2XXX, etc.) for the Diameter codes identified in the Diameter code column. The Diameter code column may include Diameter codes generated in accordance with the Diameter protocol. For example, Diameter code "3002" may indicate that a Diameter routing issue has occurred.

The code description column may include a description associated with a Diameter code listed in the Diameter code column. For example, Diameter code "3005" may indicate (e.g., in the code description column) that a Diameter routing loop has been detected by HSS 242. The trigger column may include information describing why a particular Diameter code is generated. For example, the trigger column may state that HSS 242 sends Diameter code "3004" when HSS 242 is temporarily overloaded.

The MME error behavior column may include information describing MME error behavior for the Diameter codes identified in the Diameter code column. For example, MME 232 may indicate a network failure when Diameter error code "5004" is generated. The retry alternate HSS column may include an indication (e.g., Yes (Y), No (Y), etc.) of whether an alternate HSS 242 is to be retried before sending a NAS message to UE 210. The MME sends NAS error column may include information describing NAS errors sent by MME 232 for the Diameter codes identified in the Diameter code column.

Although Table 2 shows example information that may be included in data structure 420, in other implementations, data structure 420 may include less information, different information, differently arranged information, or more information than depicted in Table 2.

As further shown in FIG. 4, EIR 250 may provide an error code 430 to MME 232 via the S13 interface. In one example, error code 430 may be defined by data structure 420 associated with the S13 interface. In one example implementation, data structure 420 may include the information provided in Table 1 and/or Table 2, above.

MME 232 may provide a translated EPS mobility management (EMM) error code 440 to UE 210. In one example, MME 232 may utilize a data structure 450 to translate error code 410 or error code 430 into translated EMM error code 440. Data structure 450 may include, for example, a table used to define error standards for the interface between MME 232 and UE 210. In one example implementation, data structure 450 may include the information provided in Table 3.

TABLE 3

EMM Error Standards For MME to UE Interface

| NAS EMM Code | Code Desc. | Tigger | Att. Rej. | Det. Req. | TAU Rej. | Serv. Rej. | UE Behavior |
|---|---|---|---|---|---|---|---|
| 2 | IMSI unknown in HSS | Implicit detach due to a failure in the network e.g. MME/HSS not in sync | No | Yes | N/A | N/A | Depending upon the request from the MME, UE shall reattach if detach type "re-attach required" or consider the USIM as invalid if detach type set to "re-attach not required" |
| 3 | Illegal UE | Authentication failed. MME is not able to validate the UE based on the generated keys. | Yes | Yes | Yes | Yes | UE shall cease attempting to attach to any LTE network until it is power-cycled or the UICC is replaced. |
| 5 | IMEI not accepted | This code tells the UE that the network does not support limited service mode for Emergency calls. | N/A | N/A | N/A | N/A | N/A |
| 6 | Illegal ME | EIR responds with a success on S13 for the device | Yes | Yes | Yes | Yes | Device is blacklisted and cannot be allowed on the network. UE shall cease attempting to attach to any LTE network until it is power-cycled or the UICC is replaced. |
| 7 | EPS services not allowed | UE should support this as can be sent by a network UE is roaming in. | Yes | Yes | Yes | N/A | Store the PLMN as barred for EPS service access and search for alternate PLMN. UE shall cease attempting to attach to any LTE network until it is power-cycled or the UICC is replaced. |
| 8 | EPS services and non-EPS services not allowed | HSS sends Diameter Error 5001 | Yes | Yes | Yes | N/A | USIM is invalid for EPS services. UE shall cease attempting to attach to any LTE network until it is power-cycled or the UICC is removed/replaced. |
| 7 | EPS services not allowed | Operator Policy set in HSS | Yes | Yes | N/A | N/A | UE is not allowed to reattach until switching off or the UICC containing the USIM is removed |
| 19 | ESM Failure | Operator Policy set in HSS | Yes | Yes | N/A | N/A | USIM is not allowed for H-PLMN access while roaming. UE should not attempt this |

TABLE 3-continued

EMM Error Standards For MME to UE Interface

| NAS EMM Code | Code Desc. | Tigger | Att. Rej. | Det. Req. | TAU Rej. | Serv. Rej. | UE Behavior |
|---|---|---|---|---|---|---|---|
| | | | | | | | access until power off and/or USIM change |
| 19 | ESM Failure | Operator Policy set in HSS | Yes | Yes | N/A | N/A | USIM is not allowed for V-PLMN roaming access. UE should not attempt this until power off and/or USIM change |
| 9 | UE identity cannot be derived by the network. | MME cannot derive the UE's identity from the Integrity check failure | Yes | Yes | Yes | N/A | UE shall automatically initiate the attach procedure with IMSI. Triggers a new IMSI attach |
| 10 | Implicitly detached | MME restart scenario or timer expiry (e.g. Due to a radio Link Failure etc.) | N/A | N/A | Yes | Yes | UE deletes its security context and is considered detached but must perform immediate attach unless sent along with "Re-attach not required". Triggers a new Globally Unique Temporary Identity (GUTI) attach request |
| 11 | PLMN Not Allowed | HSS sends Diameter Error 5004. Attach or TAU in a PLMN where the UE, by subscription or due to operator determined barring, is not allowed to operate in the specified PLMN. Roaming scenarios. | Yes | Yes | Yes | Yes | UE should store PLMN in the forbidden PLMN list and attempt PLMN selection. No more attempts should be made on current PLMN. Only applies when the UE is on a roaming PLMN. |
| 12 | Tracking area not allowed | | N/A | N/A | N/A | N/A | N/A |
| 13 | Roaming not allowed in this tracking area | | N/A | N/A | N/A | N/A | N/A |
| 14 | EPS services not allowed in this PLMN | Roaming Restrictions added in the subscriber profile in the HSS | Yes | Yes | Yes | N/A | UE should store PLMN in the "forbidden PLMNs for GPRS service" and search for alternative PLMN. No more attempts should be made on current PLMN. Only applies when the UE is on a roaming PLMN. |
| 15 | No suitable cells in tracking area | HSS sends Diameter Error 5421. UE trying to access RAT type not allowed by subscription | Yes | Yes | Yes | Yes | UE shall not attempt further attachment attempts on any cell associated with the current Tracking Area ID until it is power-cycled or the UICC is replaced or the 24 hour forbidden list timer expires. |
| 15 | No suitable cells in tracking area | HSS sends Diameter Error 5420. UE subscription is not allowed to operate in the Tracking Area | Yes | Yes | Yes | Yes | UE shall not attempt further attachment attempts on any cell associated with the current Tracking Area ID until it is power-cycled or the UICC is replaced or the 24 hour forbidden list timer expires. |
| 15 | No suitable cells in tracking area | HSS sends Diameter Error 5003. UE not authorized or mis-provisioned in the network | Yes | Yes | Yes | Yes | UE shall not attempt further attachment attempts on any cell associated with the current Tracking Area ID until it is power-cycled or the UICC is replaced or the 24 hour forbidden list timer expires. The cause code does not distinguish mis-provisioned UE vs. actual subscription denied and hence UE is unaware of the fact that the attempts will always fail |
| 16 | MSC temporarily not reachable | | Yes | N/A | Yes | N/A | UE could retry after a certain period |
| 17 | Network Failure | HSS sends Diameter Error 5012. Database | Yes | N/A | Yes | N/A | Increment the procedure count and retry. If UE receives 2 |

TABLE 3-continued

EMM Error Standards For MME to UE Interface

| NAS EMM Code | Code Desc. | Tigger | Att. Rej. | Det. Req. | TAU Rej. | Serv. Rej. | UE Behavior |
|---|---|---|---|---|---|---|---|
| | | error or other failure in HSS | | | | | consecutive #17 cause codes, it should abort the procedure and stop retrying until timer expires (12 minutes). |
| N/A | N/A | N/A | N/A | N/A | N/A | N/A | N/A |
| 17 | Network Failure | HSS sends Base Diameter Error 5004. Mis-formed message from MME or other decode failure at HSS | Yes | N/A | N/A | N/A | Increment the procedure count and retry. If UE receives 2 consecutive #17 cause codes, it should abort the procedure and stop retrying until timer expires (12 minutes) |
| N/A | N/A | N/A | N/A | N/A | N/A | N/A | N/A |
| N/A | N/A | N/A | N/A | N/A | N/A | N/A | N/A |
| 17 | Network Failure | Internal Network Failure or Authentication issue | Yes | N/A | N/A | N/A | Increment the procedure count and retry. If UE receives 2 consecutive #17 cause codes, it should abort the procedure and stop retrying until timer expires (12 minutes) |
| 17 | Network Failure | Internal Network Failure or Authentication issue | Yes | N/A | N/A | N/A | Increment the procedure count and retry. If UE receives 2 consecutive #17 cause codes, it should abort the procedure and stop retrying until timer expires (12 minutes) |
| N/A | N/A | N/A | N/A | N/A | N/A | N/A | N/A |
| 17 | Network Failure | Internal Network Failure or Authentication issue | Yes | N/A | N/A | N/A | Increment the procedure count and retry. If UE receives 2 consecutive #17 cause codes, it should abort the procedure and stop retrying until timer expires (12 minutes) |
| 18 | CS domain not available | UE requests CS Domain Services. | Yes | N/A | N/A | Yes | UE should no longer request CS domain, but may request or proceed with PS domain. |
| 19 | ESM failure | This EMM code indicates an ESM failure occurred. Triggered in a scenario where Attach succeeds but PDN connectivity fails. | Yes | N/A | N/A | N/A | UE shall look at the corresponding ESM failure and act accordingly. If UE receives 3 consecutive #19 cause codes, it aborts the attach procedure and stops retrying until timer expires (12 minutes). If the ESM cause code in the PDN Reject is #54, UE switches to type = initial on the next retry. For all other ESM cause codes, the UE switches to the class 3 APN for the next retry. |
| 20 | MAC Failure | Error from UE to MME. Uplink NAS Message. | N/A | N/A | N/A | N/A | N/A |
| 21 | Synch failure | Error from UE to MME. Uplink NAS Message. | N/A | N/A | N/A | N/A | N/A |
| 22 | Congestion | | N/A | N/A | N/A | N/A | N/A |
| 23 | UE security capabilities mismatch | Error from UE to MME. Uplink NAS Message. | N/A | N/A | N/A | N/A | N/A |
| 24 | Security mode rejected, unspecified | Error from UE to MME. Uplink NAS Message. | N/A | N/A | N/A | N/A | N/A |
| 25 | Not authorized for this CSG | Potential scenario for EPS 3.0 | Yes | Yes | Yes | Yes | Update the CSG list (delete entry) and search for alternative cell in the same PLMN |
| 26 | Non-EPS authentication unacceptable | Error from UE to MME. Uplink NAS Message. | N/A | N/A | N/A | N/A | N/A |
| 39 | CS domain temporarily not available | Extended Service Request failure | N/A | N/A | N/A | Yes | Wait until timer expires before reattempting Service Request. If TAU is needed service can be tried immediately or for emergency calls, it can be retried |

TABLE 3-continued

EMM Error Standards For MME to UE Interface

| NAS EMM Code | Code Desc. | Tigger | Att. Rej. | Det. Req. | TAU Rej. | Serv. Rej. | UE Behavior |
|---|---|---|---|---|---|---|---|
| 40 | No EPS bearer context activated | MME restart scenario or when the network implicitly cleared the resources for a UE | N/A | N/A | Yes | N/A | UE deletes its security context and is considered detached but must perform immediate attach unless sent along with "Re-attach not required". Triggers a new GUTI Attach |
| 17 | Network Failure | HSS sends Diameter 3001 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3002 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3003 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3004 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3005 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3006 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3007 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3008 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3009 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 3010 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 4001 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 4002 | Yes | N/A | N/A | N/A | Increment the procedure count and retry. If UE receives 2 |

TABLE 3-continued

EMM Error Standards For MME to UE Interface

| NAS EMM Code | Code Desc. | Tigger | Att. Rej. | Det. Req. | TAU Rej. | Serv. Rej. | UE Behavior |
|---|---|---|---|---|---|---|---|
| | | | | | | | consecutive #17 cause codes, it should abort the procedure and stop retrying until timer expires (12 minutes) |
| 17 | Network Failure | HSS sends Diameter 4003 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5001 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5002 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5005 | Yes | Yes | Yes | N/A | Increment the procedure count and retry. If UE receives 2 consecutive #17 cause codes, it should abort the procedure and stop retrying until timer expires (12 minutes) |
| 17 | Network Failure | HSS sends Diameter 5006 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5007 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5008 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5009 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5010 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5011 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5012 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5013 | Yes | N/A | N/A | N/A | Increment the procedure count and retry. If UE receives 2 consecutive #17 cause codes, it should abort the procedure and |

TABLE 3-continued

EMM Error Standards For MME to UE Interface

| NAS EMM Code | Code Desc. | Tigger | Att. Rej. | Det. Req. | TAU Rej. | Serv. Rej. | UE Behavior |
|---|---|---|---|---|---|---|---|
| 17 | Network Failure | HSS sends Diameter 5014 | Yes | N/A | N/A | N/A | stop retrying until timer expires (12 minutes) Increment the procedure count and retry. If UE receives 2 consecutive #17 cause codes, it should abort the procedure and stop retrying until timer expires (12 minutes) |
| 17 | Network Failure | HSS sends Diameter 5015 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5016 | Yes | N/A | N/A | N/A | Increment the procedure count and retry. If UE receives 2 consecutive #17 cause codes, it should abort the procedure and stop retrying until timer expires (12 minutes) |
| 17 | Network Failure | HSS sends Diameter 5017 | Yes | N/A | N/A | N/A | Increment the procedure count and retry. If UE receives 2 consecutive #17 cause codes, it should abort the procedure and stop retrying until timer expires (12 minutes) |
| 95 | Semantically incorrect message | MME has a problem with NAS EMM message from UE | Yes | Yes | Yes | Yes | Increment the corresponding procedure count to 5 and Start timer (12 minutes) |
| 96 | Invalid mandatory information | MME has a problem with NAS EMM message from UE | Yes | Yes | Yes | Yes | Increment the corresponding procedure count to 5 and Start timer (12 minutes) |
| 97 | Message type non-existent or not implemented | MME has a problem with NAS EMM message from UE | Yes | Yes | Yes | Yes | Increment the corresponding procedure count to 5 and Start timer (12 minutes) |
| 99 | Information element non-existent or not implemented | MME has a problem with NAS EMM message from UE | Yes | Yes | Yes | Yes | Increment the corresponding procedure count to 5 and Start timer (12 minutes) |
| 100 | Conditional IE error | MME has a problem with NAS EMM message from UE | Yes | Yes | Yes | Yes | Increment the corresponding procedure count to 5 and Start timer (12 minutes) |
| 101 | Message not compatible with protocol state | MME has a problem with NAS EMM message from UE | Yes | Yes | Yes | Yes | Increment the corresponding procedure count to 5 and Start timer (12 minutes) |
| 111 | Protocol error, unspecified | MME has a problem with NAS EMM message from UE | Yes | Yes | Yes | Yes | Increment the corresponding procedure count to 5 and Start timer (12 minutes) |
| N/A | N/A | N/A | N/A | N/A | N/A | N/A | N/A |
| N/A | N/A | N/A | N/A | N/A | N/A | N/A | N/A |

In one example implementation, the rows of Table 1 may align with (e.g., map to) the rows of Table 3. As shown in Table 3, data structure 450 may include a NAS EMM code column, a code description column, a trigger column, EMM message type columns (e.g., an attach reject column, a detach request column, a tracking area update (TAU) reject column, and a service reject column), a UE behavior column, and a variety of entries associated with the columns. The NAS EMM code column may provide identifiers (e.g., numbers) for NAS EMM error codes provided from MME 232 to UE 210. The code description column may include a description associated with a NAS EMM code listed in the NAS EMM code column. For example, NAS EMM code "17" may indicate (e.g., in the code description column) a network failure. The trigger column may include information describing why a particular NAS EMM code is generated. For example, the trigger column may indicate that NAS EMM code "3" is generated when MME 232 is not able to validate UE 210 based on generated keys.

The attach reject column may provide an indication (e.g., Yes, No, or not applicable (N/A)) of whether an attach rejection is associated with a NAS EMM code identified in the NAS EMM code column. The detach request column may provide an indication (e.g., Yes, No, or N/A) of whether a detach rejection is associated with a NAS EMM code identified in the NAS EMM code column. The TAU reject column may provide an indication (e.g., Yes, No, or N/A) of whether a TAU rejection is associated with a NAS EMM code identified in the NAS EMM code column. The service reject column may provide an indication (e.g., Yes, No, or N/A) of whether a service rejection is associated with a NAS EMM code identified in the NAS EMM code column. The UE behavior column may include information describing how UE 210 is behave for each NAS EMM code of the NAS EMM code column.

Although Table 3 shows example information that may be included in data structure 450, in other implementations, data structure 450 may include less information, different information, differently arranged information, or more information than depicted in Table 3.

MME 232 may provide a translated EPS session management (ESM) error code 460 to UE 210. In one example, MME 232 may utilize a data structure 470 to translate error code 410 or error code 430 into translated ESM error code 460. Data structure 470 may include, for example, a table used to define error standards for the interface between MME 232 and UE 210. In one example implementation, data structure 470 may include the information provided in Table 4.

TABLE 4

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| 8 | Operator Determined Barring | Operator policy | N/A | N/A | N/A | N/A | N/A | N/A | USIM is not allowed for H-PLMN access while roaming. UE should not attempt for this access until power off and/or USIM change |
| 8 | Operator Determined Barring | Operator policy | N/A | N/A | N/A | N/A | N/A | N/A | USIM is not allowed for V-PLMN roaming access. UE should not attempt for this until power off and/or USIM change |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| 38 | Network failure | Database error or other failure on HSS | Yes | Yes | N/A | N/A | N/A | N/A | Device shall throttle any further PDN connection attempts using X minutes between attempts. |
| N/A | N/A | N/A | N/A | N/A | N/A | N/A | N/A | N/A | N/A |
| 38 | Network failure | Mis-formed message from MME or other decode failure at HSS | Yes | Yes | N/A | N/A | N/A | N/A | Device shall throttle any further PDN connection attempts using X minutes between attempts. |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| 26 | Insufficient resources | Resource issues at PGW or a | N/A | Yes | Yes | Yes | N/A | N/A | Device shall throttle any further PDN |

TABLE 4-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| | | failure received with resource shortage from peer | | | | | | | connection attempts using X minutes between attempts. |
| N/A | N/A | N/A | N/A | N/A | N/A | N/A | N/A | N/A | N/A |
| N/A | N/A | N/A | N/A | N/A | N/A | N/A | N/A | N/A | After 3 consecutive attempts to the network with the same failure code increase attach counter to 5 and stop retrying until timer expires (12 minutes). If the ESM cause code in the PDN Reject is #54, UE switches to type = initial on the next retry. For all other ESM cause codes, the UE switches to the class 3 access point name (APN) for the next retry. |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |

TABLE 4-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| 33 | Requested service option not subscribed | No APN Configuration AVP present | N/A | Yes | Yes | Yes | N/A | N/A | Upon second consecutive ESM 33, UE shall not attempt any further PDN connection requests using this APN while in the given PLMN until UE power cycle |
| 27 | Missing or unknown APN | DNS query (from MME) fails | N/A | Yes | Yes | Yes | N/A | N/A | Upon second consecutive ESM 27, UE shall not attempt any further PDN connection requests using this APN while in the given PLMN until UE power cycle |

In one example implementation, the rows of Table 4 may align with (e.g., map to) the rows of Tables 1 and/or 3. As shown in Table 4, data structure 470 may include a NAS ESM column, a code description column, a trigger column, ESM message type columns (e.g., a deactivate bearer request column, a PDN connectivity rejection column, a bearer resource allocation rejection column, a bearer resource modification rejection column, a PDN disconnect rejection column, and an ESM status column), a UE behavior column, and a variety of entries associated with the columns. The NAS ESM code column may provide identifiers (e.g., numbers) for NAS ESM error codes provided from MME 232 to UE 210. The code description column may include a description associated with a NAS ESM code listed in the NAS ESM code column. For example, NAS ESM code "33" may indicate (e.g., in the code description column) that requested service option is not subscribed to by UE 210. The trigger column may include information describing why a particular NAS ESM code is generated. For example, the trigger column may indicate that NAS ESM code "38" is generated when a database error or other failure occurs in HSS 242.

The deactivate bearer request column may provide an indication (e.g., Yes, No, or N/A) of whether a deactivate EPS bearer content request is associated with a NAS ESM code identified in the NAS ESM code column. The PDN connectivity rejection column may provide an indication (e.g., Yes, No, or N/A) of whether a PDN connectivity rejection is associated with a NAS ESM code identified in the NAS ESM code column. The bearer resource allocation rejection column may provide an indication (e.g., Yes, No, or N/A) of whether a bearer resource allocation rejection is associated with a NAS ESM code identified in the NAS ESM code column. The bearer resource modification rejection column may provide an indication (e.g., Yes, No, or N/A) of whether a bearer resource modification rejection is associated with a NAS ESM code identified in the NAS ESM code column. The PDN disconnect rejection column may provide an indication (e.g., Yes, No, or N/A) of whether a PDN disconnect rejection is associated with a NAS ESM code identified in the NAS ESM code column. The ESM status column may provide an indication (e.g., Yes, No, N/A) of whether an ESM status is associated with a NAS ESM code identified in the NAS ESM code column. The UE behavior column may include information describing how UE 210 is behave for each NAS ESM code of the NAS ESM code column.

Although Table 4 shows example information that may be included in data structure 470, in other implementations, data structure 470 may include less information, different information, differently arranged information, or more information than depicted in Table 4.

Although FIG. 4 shows example components of environment portion 400, in other implementations, environment portion 400 may include fewer components, different components, differently arranged components, or additional components than depicted in FIG. 4. Alternatively, or additionally, one or more components of environment portion 400 may perform one or more other tasks described as being performed by one or more other components of environment portion 400.

FIG. 5 is a diagram of example interactions among components of another example portion 500 of environment portion 200 (FIG. 2). As shown, example environment portion 500 may include UE 210, MME 232, SGW 234, and PGW 238. UE 210, MME 232, SGW 234, and PGW 238 may include the features described above in connection with, for example, one or more of FIGS. 1-4.

As further shown in FIG. 5, PGW 238 may provide an error code 510 to SGW 234 via the S5 interface. In one example, error code 510 may be defined by a data structure 520 associated with the S5 interface. SGW 234 may provide an error code 530 to MME 232 via the S11 interface. In one example, error code 530 may be defined by data structure 520 associated with the S11 interface. Data structure 520 may include a table used to define error standards for the S5 and S11 interfaces. In one example implementation, data structure 520 may include the information provided in Table 5.

TABLE 5

Error Standards For S5/S11 Interfaces

| Code Type | GTP Code | Code Description | Trigger |
|---|---|---|---|
| T | 73 | No resources available | System is booting up and is not yet ready process any request. Due to system limitation, like memory shortage, incoming GTP request cannot be processed and will be rejected due to: (1) new call policy; (2) license limit exceeded; (3) congestion control policy; etc. Modify bearer command may fail and bearer resource command may be rejected. eHRPD-to-LTE handoff may be rejected, and a create session may be rejected due to some local failure. |
| P | 64 | Context Not Found (in PGW) | Used in response message, when the UE context corresponding to the received message is not found at PGW. Applicable to responses of Modify Bearer Req, Delete Session, Bearer Resource Cmd, Modify Bearer Cmd etc. |
| P | 64 | Context Not Found (in SGW) | Used in response message, when the UE context corresponding to the received message is not found at SGW. Applicable to responses of Modify Bearer Req, Delete Session, Bearer Resource Cmd, Modify Bearer Cmd etc. |
| P | 65 | Invalid Message Format | Used in response message when there is parsing error in the received message. Modify bearer command received with invalid QCI in Bearer-QOS. |
| P | 66 | Version not supported by next peer | GTP message received with a GTP version that is not supported. |
| P | 67 | Invalid length | Parse Error or badly formed msg. |
| P | 68 | Service not supported | Not sent by PGW |
| P | 69 | Mandatory IE incorrect | Mandatory IE received with incorrect value in it. |
| P | 70 | Mandatory IE missing | Mandatory IE missing in the received GTP message |
| N/A | 71 | Reserved | Not sent by PGW |
| P | 72 | System failure | Not sent by PGW |
| P | 74 | Semantic error in the TFT operation | Not sent by PGW |
| T | 75 | Syntactic error in the TFT operation | Not sent by PGW |
| T | 76 | Semantic errors in packet filter(s) | Semantic error in Traffic Aggregate Description received in Bearer Resource Command |
| T | 77 | Syntactic errors in packet filter(s) | Not sent by PGW |
| P | 78 | Missing or unknown APN | Invalid APN received in the request in Create Session Request |
| T | 79 | Unexpected repeated IE | |
| P | 80 | GRE key not found | Not sent by PGW |
| P | 81 | Relocation failure | Not sent by PGW |
| P | 82 | Denied in radio access technology (RAT) | Not sent by PGW |
| P | 83 | Preferred PDN type not supported | Unsupported PDN type for the requested APN |
| T | 84 | All dynamic addresses are occupied | Temporary resource issue and unable to assign IP address to UE during Create Session Request |
| T | 85 | UE context without traffic flow template (TFT) already activated | Not sent by PGW |
| P | 86 | Protocol type not supported | Not sent by PGW |
| T | 87 | UE not responding | Not sent by PGW |
| T | 88 | UE refuses | Not sent by PGW |
| T | 89 | Service denied | Used in case of Bearer Resource Command if there is failure from PCRF or a reject message |
| T | 90 | Unable to page UE | Not sent by PGW |
| T | 91 | No memory available | Not sent by PGW |
| P | 92 | User authentication failed | AAA authentication for the Subscriber failed, invalid returned APN on Radius, reauthentication with Radius returned APN failed, S6b authentication failure, etc. |
| P | 93 | APN access denied - no subscription | Static Address not allowed, APN selection mode mismatch, APN restriction violation, etc. |

TABLE 5-continued

Error Standards For S5/S11 Interfaces

| Code Type | GTP Code | Code Description | Trigger |
|---|---|---|---|
| T | 94 | Request rejected | If GTP reques validation fails, a response is sent with this cause.<br>If PGW receives a delete bearer command with non-existent set of EBIs, PGW will send delete bearer failure indication message with "Bearer Context" corresponding to the EBIs that do not exist with PGW, with message level cause as "Request Rejected", and bearer level cause as "Context Not Found" |
| T | 95 | P-TMSI Signature mismatch | Not sent by PGW |
| P | 96 | IMSI not known | Not sent by PGW |
| T | 97 | Semantic error in the TAD operation | Some Filter-Ids in Traffic Aggregate Description (TAD) to remove list doesn't exist |
| T | 98 | Syntactic error in the TAD operation | Not sent by PGW |
| P | 99 | Reserved Message Value Received | Not sent by PGW |
| T | 100 | Remote peer not responding | Not sent by PGW<br>Sent by SGW |
| T | 101 | Collision with network initiated request | Not sent by PGW |
| T | 102 | Unable to page UE due to Suspension | Not sent by PGW |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |
| N/A | N/A | N/A | N/A |

As shown in Table 5, data structure 520 may include a code type column, a general packet radio service (GPRS) tunneling protocol (GTP) code column, a code description column, a trigger column, and a variety of entries associated with the columns. The code type column may provide classes for the GTP codes identified in the GTP code column. The types may include, for example, a permanent (P) type, a transient (T) type, a protocol (Pro) type, a success (S) type, an informational (I) type, and/or no type (N/A). The GTP code column may include GTP codes generated in accordance with the GPRS tunneling protocol. For example, GTP code "69" may indicate that a mandatory information element (IE) is received with an incorrect value.

The code description column may include a description associated with a GTP code listed in the GTP code column. For example, GTP code "83" may indicate (e.g., in the code description column) that a preferred PDN type is not supported. The trigger column may include information describing why a particular GTP code is generated. For example, GTP code "84" may indicate (e.g., in the trigger column) that a temporary resource issue has occurred and an IP address cannot be assigned to UE 210.

Although Table 5 shows example information that may be included in data structure 520, in other implementations, data structure 520 may include less information, different information, differently arranged information, or more information than depicted in Table 5.

MME 232 may provide a translated ESM error code 540 to UE 210. In one example, MME 232 may utilize a data structure 550 to translate error code 510 or error code 530 into translated ESM error code 540. Data structure 550 may include, for example, a table used to define error standards for the interface between MME 232 and UE 210. In one example implementation, data structure 550 may include the information provided in Table 6.

TABLE 6

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| 26 | Insufficient resources | Resource issues at PGW or a failure received with resource shortage from peer | N/A | Yes | Yes | Yes | N/A | N/A | UE shall throttle any further PDN connection attempts using minutes between attempts. |
| 30 | Request rejected by SGW or PGW | PGW message | N/A | Yes | Yes | Yes | N/A | N/A | UE shall throttle any further PDN connection attempts using minutes between attempts. UE shall not initiate quality of service (QoS) and UE initiated QoS messages shall be rejected by MME. |
| 30 | Request rejected by SGW or PGW | SGW message | N/A | Yes | Yes | Yes | N/A | N/A | UE shall throttle any further PDN connection attempts using minutes between attempts. UE shall not initiate quality of service (QoS) and UE initiated QoS messages shall be rejected by MME. |
| 30 | Request rejected by SGW or PGW | Invalid QCI in bearer-QoS, parsing error. Could be originated in QoS info., PCRF malforming the message, invalid provisioning or other network element malforming other parameters | N/A | Yes | Yes | Yes | N/A | N/A | UE shall throttle any further PDN connection attempts using minutes between attempts. UE shall not initiate quality of service (QoS) and UE initiated QoS messages shall be rejected by MME. |
| 30 | Request rejected by SGW or PGW | Unsupported protocol | N/A | Yes | Yes | Yes | N/A | N/A | UE shall throttle any further PDN connection attempts using minutes between |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| | | | | | | | | | attempts. UE shall not initiate quality of service (QoS) and UE initiated QoS messages shall be rejected by MME. |
| 30 | Request rejected by SGW or PGW | Unsupported protocol | N/A | Yes | Yes | Yes | N/A | N/A | UE shall throttle any further PDN connection attempts using minutes between attempts. UE shall not initiate quality of service (QoS) and UE initiated QoS messages shall be rejected by MME. |
| 32 | Service option not supported/ Network Failure | UE requests for an unsupported PDN type for the requested APN. Potentially a misconfig. | N/A | Yes | N/A | N/A | N/A | N/A | UE should attempt with a different PDN type in the PDN connectivity request and if none else supported, attempt a different PLMN |
| 30 | Request rejected by SGW or PGW | Invalid message contents | N/A | Yes | Yes | Yes | N/A | N/A | UE shall throttle any further PDN connection attempts using minutes between attempts. UE shall not initiate quality of service (QoS) and UE initiated QoS messages shall be rejected by MME. |
| 30 | Request rejected by SGW or PGW | Unsupported protocol | N/A | Yes | Yes | Yes | N/A | N/A | UE shall throttle any further PDN connection attempts using minutes between attempts. UE shall not initiate quality of service (QoS) |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| | | | | | | | | | and UE initiated QoS messages shall be rejected by MME. |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| 44 | Semantic errors in packet filter(s) | N/A | N/A | N/A | N/A | N/A | N/A | N/A | N/A |
| 45 | Syntactical error in packet filter(s) | N/A | N/A | N/A | N/A | N/A | N/A | N/A | N/A |
| 27 | Missing or unknown APN | APN not configured in the PGW | N/A | Yes | N/A | N/A | N/A | N/A | IF UE Receives two consecutive ESM 27 messages, UE shall not attempt any further PDN connection requests using this APN while in the given PLMN until UE power cycle |
| N/A | N/A | N/A | N/A | N/A | N/A | N/A | N/A | N/A | N/A |
| 30 | Request rejected by SGW or PGW | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |
| 32 | Service option not supported/ Network Failure | UE requests for an unsupported PDN type for the requested APN. Potentially a misconfig. | N/A | Yes | N/A | N/A | N/A | N/A | IF UE Receives two consecutive ESM 27 messages, UE shall not attempt any further PDN connection requests using this APN while in the given PLMN until UE power cycle |
| 26 | Insufficient resources | Shortage of IP addresses to be allocated in the system due to temporary issue | N/A | Yes | Yes | Yes | N/A | N/A | UE shall throttle any further PDN connection attempts using minutes between attempts. |
| N/A | N/A | N/A | N/A | N/A | N/A | N/A | N/A | N/A | N/A |
| 30 | Request rejected by SGW or PGW | N/A | N/A | N/A | N/A | N/A | N/A | N/A | N/A |
| N/A | N/A | N/A | N/A | N/A | N/A | N/A | N/A | N/A | N/A |
| N/A | N/A | N/A | N/A | N/A | N/A | N/A | N/A | N/A | N/A |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| 30 | Request rejected by SGW or PGW | Failure scenario in the network or subscriber does not have access to requested service due to network policy | N/A | Yes | Yes | Yes | N/A | N/A | UE shall throttle any further PDN connection attempts using minutes between attempts. UE shall not initiate QoS and UE initiated QoS messages shall be rejected by MME. |
| N/A | N/A | N/A | N/A | N/A | N/A | N/A | N/A | N/A | N/A |
| 26 | Insufficient Resources | N/A | N/A | N/A | N/A | N/A | N/A | N/A | N/A |
| 29 | User authent. failed | User authentication failed at AAA or during re-auth | N/A | Yes | N/A | N/A | N/A | N/A | IF UE Receives two consecutive ESM 29 messages, UE shall not attempt any further PDN connection requests using this APN while in the given PLMN until UE power cycle |
| 33 | Requested service option not subscribed | UE request in violation of the current restrictions on the active EPS bearer context | Yes | Yes | N/A | N/A | N/A | N/A | IF UE Receives two consecutive ESM 33 messages, UE shall not attempt any further PDN connection requests using this APN while in the given PLMN until UE power cycle |
| 30 | Request rejected by SGW or PGW | N/A | N/A | Yes | Yes | Yes | N/A | N/A | UE shall throttle any further PDN connection attempts using minutes between attempts. UE shall not initiate QoS and UE initiated QoS messages shall be rejected by MME. |
| N/A | N/A | N/A | N/A | N/A | N/A | N/A | N/A | N/A | N/A |
| N/A | N/A | N/A | N/A | N/A | N/A | N/A | N/A | N/A | N/A |
| 41 | Semantic error in the | N/A | N/A | N/A | N/A | N/A | N/A | N/A | N/A |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| 42 | Syntactical error in the TFT operation | N/A | N/A | N/A | N/A | N/A | N/A | N/A | N/A |
| N/A | N/A | N/A | N/A | N/A | N/A | N/A | N/A | N/A | N/A |
| 38 | Request rejected by SGW or PGW | S5 link down or PGW not responding. Sent only after retry by MME. | N/A | Yes | Yes | Yes | N/A | N/A | UE shall throttle any further PDN connection attempts using minutes between attempts. |
| 56 | Collision with network initiated request | N/A | N/A | N/A | N/A | N/A | N/A | N/A | N/A |
| N/A | N/A | N/A | N/A | N/A | N/A | N/A | N/A | N/A | N/A |
| 27 | Missing or unknown APN | MME detects an invalid APN or unauthorized APN for the subscriber during PDN connectivity. | N/A | Yes | N/A | N/A | N/A | N/A | IF UE Receives two consecutive ESM 27 messages, UE shall not attempt any further PDN connection requests using this APN while in the given PLMN until UE power cycle |
| 28 | Unknown PDN type | MME detects that UE is requesting invalid or unknown PDN based on subscription profile | N/A | Yes | N/A | N/A | N/A | N/A | UE should switch to PDN type = IPv4v6 for all retries. |
| 31 | Request rejected, unspecified | UE is attempting bearer modification or an additional PDN connection while attached for Emergency Bearer Service | N/A | Yes | Yes | Yes | N/A | N/A | UE shall throttle any further PDN connection attempts using minutes between attempts. |
| 33 | Requested service option not subscribed | UE requested service type is not authorized or subscribed to | N/A | Yes | Yes | Yes | N/A | N/A | IF UE receives two consecutive ESM 33 messages, UE shall not attempt any further PDN connection requests using this APN while in the given PLMN until |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| 35 | PTI already in use | Procedure Transaction ID is invalid as attempted by the UE | N/A | Yes | Yes | Yes | N/A | N/A | UE power cycle UE should abort the current procedure and clear the PTI and enter Procedure Transaction Inactive state. UE may reattempt the procedure with a different PTI. |
| 36 | Regular deactivate | Network triggered deactivation either due to UE request or an abnormal condition in the network or operator triggered deactivation due to maintenance | Yes | N/A | N/A | N/A | N/A | N/A | UE shall release the EPS bearer contexts requested and may attempt to reconnect to the PDN, if needed |
| 37 | EPS QoS not accepted | EPS QoS requested by UE is not supported or authorized. Scenario is not applicable to Verizon network as any UE requested QoS is rejected today by default | N/A | N/A | Yes | Yes | N/A | N/A | UE should not attempt any bearer allocation or modification with the QoS parameters |
| 39 | Reactivate requested | | Yes | N/A | N/A | N/A | N/A | N/A | UE should reactivate the EPS bearer context, if it was a default EPS bearer context. |
| 41 | Semantic error in the TFT operation | N/A | N/A | N/A | N/A | N/A | N/A | N/A | N/A |
| 43 | Invalid EPS bearer identity | UE uses an invalid EPS bearer ID which may have been deleted by Network due to an internal failure or other mismatch | N/A | N/A | Yes | Yes | Yes | Yes | UE shall deactivate the existing default EPS bearer context locally without peer-to-peer signaling between the UE and the MME |
| 45 | Syntactical error in packet filter(s) | N/A | N/A | N/A | N/A | N/A | N/A | N/A | N/A |
| 46 | EPS bearer context without TFT | Triggered by UE towards MME | N/A | N/A | N/A | N/A | N/A | N/A | N/A |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| | already activated | | | | | | | | |
| 47 | PTI mismatch | Triggered by UE towards MME | N/A | N/A | N/A | N/A | N/A | N/A | N/A |
| 49 | Last PDN disconnect not allowed | UE tries to deactivate the last PDN connection | N/A | N/A | N/A | N/A | Yes | N/A | UE shall stop the timer, enter the procedure transaction inactive state and abort the PDN disconnection procedure |
| 50 | PDN type IPv4 only allowed | If requested APN is configured for IPv4 operation only and UE requests IPv6 or IPv4v6 | N/A | Yes | N/A | N/A | N/A | N/A | UE should switch to PDN type = IPv4 for the next retry. |
| 51 | PDN type IPv6 only allowed | If requested APN is configured for IPv6 operation only and UE requests IPv4 or IPv4v6 | N/A | Yes | N/A | N/A | N/A | N/A | UE should switch to PDN type = IPv6 for the next retry. |
| 52 | single address bearers only allowed | UE requests PDN type IPv4v6, but the network uses single addressing per bearer | N/A | Yes | N/A | N/A | N/A | N/A | UE activates default bearer context request. UE that has been allocated an IPv4 address for this APN and received the ESM 52 message, and is requesting an IPv6 address, shall set the PDN type IE to IPv6. If UE has been allocated an IPv6 address for this APN and received the ESM 52 message, and is requesting an IPv4 address, UE shall set the PDN type IE to IPv4. UE may request a new PDN connection with IPv4 or IPv6 only request |
| 53 | ESM information not received | ESM information transfer flag in the PDN connectivity request has been set and | N/A | Yes | N/A | N/A | N/A | N/A | UE can reattempt the PDN connectivity procedure |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| 54 | PDN connection does not exist | the ESM information is not received UE sends PDN connectivity request with a default APN or a specific APN with request type set to "handover" and the MME does not have any information about that PDN connection | N/A | Yes | N/A | N/A | N/A | N/A | UE shall locally release the connection to the PDN and reattach to the PDN |
| 55 | Multiple PDN connects for a given APN not allowed | UE attempts multiple PDN connections to an APN that is not configured/ allowed for multiple PDN connections | N/A | Yes | N/A | N/A | N/A | N/A | UE shall abort the addition of the second PDN connection request and shall attempt the procedure only after the other PDN connection to the APN is terminated |
| 56 | Collision with network initiated request | UE initiates a procedure while MME initiated procedure is active | N/A | N/A | Yes | Yes | N/A | N/A | UE shall abort the procedure until the network initiated procedure completes |
| 59 | Unsupport value | N/A | N/A | N/A | N/A | N/A | N/A | N/A | N/A |
| 81 | Invalid PTI value | UE requested service uses an unassigned or reserved Procedure Transaction ID | N/A | Yes | Yes | Yes | N/A | Yes | UE should abort the current procedure and clear the PTI and enter Procedure Transaction Inactive state. UE may reattempt the procedure with a different PTI. |
| 95 | Semantic incorrect message | MME has a problem with NAS ESM message from UE | Yes | Yes | Yes | Yes | Yes | N/A | UE shall throttle any further PDN connection attempts using minutes between attempts. |
| 97 | Message type non-existent | UE Initiated Modification procedures | N/A | N/A | N/A | N/A | N/A | Yes | UE shall throttle any further PDN connection attempts using minutes |

TABLE 6-continued

ESM Error Standards For MME to UE Interface

| NAS ESM Code | Code Descr. | Trigger | Deact. Bearer Request | PDN Connect Reject | Bearer Alloc. Reject | Bearer Modif. Reject | PDN Discon. Reject | ESM Status | UE Behavior |
|---|---|---|---|---|---|---|---|---|---|
| 98 | Message type not compatible with protocol state | MME has a problem with NAS ESM message from UE | Yes | Yes | Yes | Yes | Yes | N/A | between attempts. UE shall throttle any further PDN connection attempts using minutes between attempts. |
| 99 | Information element non-existent or not implemented | MME has a problem with NAS ESM message from UE | Yes | Yes | Yes | Yes | Yes | N/A | UE shall throttle any further PDN connection attempts using minutes between attempts. |
| 100 | Conditional IE error | MME has a problem with NAS ESM message from UE | Yes | Yes | Yes | Yes | Yes | N/A | UE shall throttle any further PDN connection attempts using minutes between attempts. |
| 101 | Message not compatible with protocol state | MME has a problem with NAS ESM message from UE | Yes | Yes | Yes | Yes | Yes | N/A | UE shall throttle any further PDN connection attempts using minutes between attempts. |

In one example implementation, the rows of Table 6 may align with (e.g., map to) the rows of Table 5. As shown in Table 6, data structure 550 may include a NAS ESM code column, a code description column, a trigger column, ESM message type columns (e.g., a deactivate bearer request column, a PDN connectivity rejection column, a bearer resource allocation rejection column, a bearer resource modification rejection column, a PDN disconnect rejection column, and an ESM status column), a UE behavior column, and a variety of entries associated with the columns. The NAS ESM code column may provide identifiers (e.g., numbers) for NAS ESM error codes provided from MME 232 to UE 210. The code description column may include a description associated with a NAS ESM code listed in the NAS ESM code column. For example, NAS ESM code "26" may indicate (e.g., in the code description column) that there are insufficient resources for UE 210. The trigger column may include information describing why a particular NAS ESM code is generated. For example, the trigger column may indicate that NAS ESM code "44" is generated when there semantic errors in packet filter(s).

The deactivate bearer request column may provide an indication (e.g., Yes, No, or N/A) of whether a deactivate EPS bearer content request is associated with a NAS ESM code identified in the NAS ESM code column. The PDN connectivity rejection column may provide an indication (e.g., Yes, No, or N/A) of whether a PDN connectivity rejection is associated with a NAS ESM code identified in the NAS ESM code column. The bearer resource allocation rejection column may provide an indication (e.g., Yes, No, or N/A) of whether a bearer resource allocation rejection is associated with a NAS ESM code identified in the NAS ESM code column. The bearer resource modification rejection column may provide an indication (e.g., Yes, No, or N/A) of whether a bearer resource modification rejection is associated with a NAS ESM code identified in the NAS ESM code column. The PDN disconnect rejection column may provide an indication (e.g., Yes, No, or N/A) of whether a PDN disconnect rejection is associated with a NAS ESM code identified in the NAS ESM code column. The ESM status column may provide an indication (e.g., Yes, No, N/A) of whether an ESM status is associated with a NAS ESM code identified in the NAS ESM code column. The UE behavior column may include information describing how UE 210 is behave for each NAS ESM code of the NAS ESM code column.

Although Table 6 shows example information that may be included in data structure 550, in other implementations, data structure 550 may include less information, different information, differently arranged information, or more information than depicted in Table 6.

Although FIG. 5 shows example components of environment portion 500, in other implementations, environment portion 500 may include fewer components, different components, differently arranged components, or additional components than depicted in FIG. 5. Alternatively, or additionally, one or more components of environment portion 500 may perform one or more other tasks described as being performed by one or more other components of environment portion 500.

FIG. 6 is a diagram of example interactions among components of still another example portion 600 of environment portion 200 (FIG. 2). As shown, example environment portion 600 may include PGW 238 and AAA server 260. PGW 238 and AAA server 260 may include the features described above in connection with, for example, one or more of FIGS. 1-5.

As further shown in FIG. 6, AAA server 260 may provide an error code 610 to PGW 238 via the S6b interface. In one example, error code 610 may be defined by a data structure 620 associated with the S6b interface. Data structure 620 may include a table used to define error standards for the S6b interface. In one example implementation, data structure 620 may include the information provided in Table 7.

TABLE 7

Error Standards For S6b Interface

| Result Code Family | Diameter Code | Code Description | Trigger | PGW Error Behavior | PGW Retry Behavior |
|---|---|---|---|---|---|
| 1XXX | 1001 | DIAMETER_MULTI_ROUND_AUTH | The received authent. message from PGW requires additional requests. | Not an Error | |
| 2XXX | 2001 | DIAMETER_SUCCESS | As per RFC | Not an Error | |
|  | 2002 | DIAMETER_LIMITED_SUCCESS | Not sent | Not an Error | |
| 3XXX | 3001 | DIAMETER_COMMAND_UNSUPPORTED | The Diameter command sent by the PGW is not supported by the AAA and returns this message | Terminate | No retry |
|  | 3002 | DIAMETER_UNABLE_TO_DELIVER | AAA cannot deliver the answer to the PGW for timeout reasons | Retry-and-Terminate | Primary - no retry Secondary Peer - Once |
|  | 3003 | DIAMETER_REALM_NOT_SERVED | Missing host within the realm supporting the required application or missing destination realm AVP | Terminate | No retry |
|  | 3004 | DIAMETER_TOO_BUSY | As per HSS SWG response, the AAA forwards this error code. | Retry-and-Terminate | Primary - no retry Secondary Peer - Once |
|  | 3005 | DIAMETER_LOOP_DETECTED | An agent detected a loop while trying to get the message to the intended recipient | Retry-and-Terminate | Primary - no retry Secondary Peer - Once |
|  | 3006 | DIAMETER_REDIRECT_INDICATION | AAA is not serving the user. Therefore, AAA tells the PGW to send the request to a different peer. | Retry-and-Terminate | Primary - no retry Secondary Peer - Once |
|  | 3007 | DIAMETER_APPLICATION_UNSUPPORTED | Application ID sent by PGW is not supported | Terminate | No retry |
|  | 3008 | DIAMETER_INVALID_HDR_BITS | Diameter header combination error in the request | Terminate | No retry |
|  | 3009 | DIAMETER_INVALID_AVP_BITS | As per RFC | Terminate | No retry |
|  | 3010 | DIAMETER_UNKNOWN_PEER | Use case for CER request from unknown peer. | Retry-and-Terminate | Primary - no retry Secondary Peer - Once |
| 4XXX | 4001 | DIAMETER_AUTHENTICATION_REJECTED | The user is not authorized | | Related to STa |

TABLE 7-continued

Error Standards For S6b Interface

| Result Code Family | Diameter Code | Code Description | Trigger | PGW Error Behavior | PGW Retry Behavior |
|---|---|---|---|---|---|
| | 4002 | DIAMETER_OUT_OF_SPACE | AAA internal temporary errors | Retry-and-Terminate | Primary - no retry Secondary Peer - Once |
| | 4003 | ELECTION_LOST | | | |
| 5XXX | 5001 | DIAMETER_AVP_UNSUPPORTED | | Terminate | No retry |
| | 5001 | DIAMETER_ERROR_USER_UNKNOWN | Experimental result. There is no associated provisioned subscriber profile for this user | Terminate | No retry |
| | 5002 | DIAMETER_UNKNOWN_SESSION_ID | The requested session ID could not be found in the AAA. | Terminate | No retry |
| | 5003 | DIAMETER_AUTHORIZATION_REJECTED | The selected service is not authorized. Typically when PGW asks for a specific service that is not authorized by the policy/HSS. | Terminate | No retry |
| | 5004 | DIAMETER_INVALID_AVP_VALUE | The request contained an AVP with a not allowed value, based on the S6b reference points AVP definitions. | Terminate | No retry |
| | 5005 | DIAMETER_MISSING_AVP | A mandatory parameter was missing from the PGW request | Terminate | No retry |
| | 5006 | DIAMETER_RESOURCES_EXCEEDED | The system resources are exceeded and the request will not be processed. | Terminate | No retry |
| | 5007 | DIAMETER_CONTRADICTING_AVPS | Detected AVPs in the request that contradicted each other | Terminate | No retry |
| | 5008 | DIAMETER_AVP_NOT_ALLOWED | An AVP was included and must not be present | Terminate | No retry |
| | 5009 | DIAMETER_AVP_OCCURS_TOO_MANY_TIMES | An AVP appeared more often than permitted in the message definition. | Terminate | No retry |
| | 5010 | DIAMETER_NO_COMMON_APPLICATION | Use case for CER. No app ready to support the request | Terminate | No retry |
| | 5011 | DIAMETER_UNSUPPORTED_VERSION | Diameter version incorrect | Terminate | No retry |
| | 5012 | DIAMETER_UNABLE_TO_COMPLY | General error in AAA that does not let the Diameter transaction happen. | Terminate | No retry |
| | 5013 | DIAMETER_INVALID_BIT_IN_HEADER | Unrecognized Bit in Header | Terminate | No retry |
| | 5014 | DIAMETER_INVALID_AVP_LENGTH | As per RFC | Terminate | No retry |
| | 5015 | DIAMETER_INVALID_MESSAGE_LENGTH | As per RFC | Terminate | No retry |
| | 5016 | DIAMETER_INVALID_AVP_BIT_COMBO | Inconsistency with the AVP | Terminate | No retry |

TABLE 7-continued

Error Standards For S6b Interface

| Result Code Family | Diameter Code | Code Description | Trigger | PGW Error Behavior | PGW Retry Behavior |
|---|---|---|---|---|---|
| | 5017 | DIAMETER_NO_COMMON_SECURITY | flag for a given AVP Use case for CER when no common security is supported. | Terminate | No retry |

As shown in Table 7, data structure 620 may include a result code family column, a Diameter code column, a code description column, a trigger column, a PGW error behavior column, a PGW retry behavior column, and a variety of entries associated with the columns. The result code family column may provide families (e.g., 1XXX, 2XXX, etc.) for the Diameter codes identified in the Diameter code column. The Diameter code column may include Diameter codes generated in accordance with the Diameter protocol. For example, Diameter code "5002" may indicate that a requested session identifier could not be found in AAA 260.

The code description column may include a description associated with a Diameter code listed in the Diameter code column. For example, Diameter code "5011" may indicate (e.g., in the code description column) that an incorrect Diameter version is being used. The trigger column may include information describing why a particular Diameter code is generated. For example, the trigger column may state that AAA 260 sends Diameter code "5006" when resources associated with AAA 260 are exceeded and a request will not be processed.

The PGW error behavior column may include information describing PGW 238 error behavior for the Diameter codes identified in the Diameter code column. For example, MME 232 may terminate a request when Diameter error code "5004" is generated. The PGW retry behavior column may include an indication (e.g., Retry or No Retry) of whether PGW 238 will retry a request.

Although Table 7 shows example information that may be included in data structure 620, in other implementations, data structure 620 may include less information, different information, differently arranged information, or more information than depicted in Table 7.

Although FIG. 6 shows example components of environment portion 600, in other implementations, environment portion 600 may include fewer components, different components, differently arranged components, or additional components than depicted in FIG. 6. Alternatively, or additionally, one or more components of environment portion 600 may perform one or more other tasks described as being performed by one or more other components of environment portion 600.

FIGS. 7 and 8 are flow charts of an example process 700 for mapping error codes in an EPC network according to an implementation described herein. In one implementation, process 700 may be performed by a network node of EPC network 230. Alternatively, or additionally, some or all of process 700 may be performed by another device or group of devices, including or excluding a network node of EPC network 230.

As shown in FIG. 7, process 700 may include receiving an error code, destined for a UE, from an EPC node device (block 710), and comparing the error code to a data structure that maps error codes to formats understood by the UE (block 720). For example, in an implementation described above in connection with FIG. 4, HSS 242 may provide error code 410 to MME 232 via the S6a interface. MME 232 may receive error code 410, and may compare error code to data structure 420. Data structure 450 may include, for example, a table used to define error standards for the interface between MME 232 and UE 210.

As further shown in FIG. 7, process 700 may include translating the error code into a translated error code based on the comparison (block 730), and providing the translated error code to the UE (block 740). For example, in an implementation described above in connection with FIG. 4, MME 232 may provide translated EMM error code 440 to UE 210. In one example, MME 232 may utilize data structure 450 to translate error code 410 or error code 430 into translated EMM error code 440. Translated EMM error code 440 may be in a format that is understood by UE 210.

Process block 730 may include the process blocks depicted in FIG. 8. As shown in FIG. 8, process block 730 may include translating the error code into the translated error code based on an error code type (block 800), translating the error code into the translated error code based on an error code description (block 810), translating the error code into the translated error code based on an error code trigger (block 820), translating the error code into the translated error code based on an error code message type (block 830), and translating the error code into the translated error code based on error code desired UE behavior (block 840). For example, in an implementation described above in connection with FIG. 4, data structure 450 may include a NAS EMM column, a code description column, a trigger column, EMM message type columns (e.g., an attach reject column, a detach request column, a TAU reject column, and a service reject column), a UE behavior column, and a variety of entries associated with the columns. The NAS EMM code column may provide identifiers (e.g., numbers) for NAS EMM error codes provided from MME 232 to UE 210. The code description column may include a description associated with a NAS EMM code listed in the NAS EMM code column. The trigger column may include information describing why a particular NAS EMM code is generated.

The attach reject column may provide an indication of whether an attach rejection is associated with a NAS EMM code identified in the NAS EMM code column. The detach request column may provide an indication of whether a detach rejection is associated with a NAS EMM code identified in the NAS EMM code column. The TAU reject column may provide an indication of whether a TAU rejection is associated with a NAS EMM code identified in the NAS EMM code column. The service reject column may provide an indication of whether a service rejection is associated with a NAS EMM code identified in the NAS EMM code column.

The UE behavior column may include information describing how UE 210 is behave for each NAS ESM code of the NAS EMM code column.

Systems and/or methods described herein may provide mechanisms to prevent failures in an EPC network. In one example, the systems and/or methods may provide mechanisms (e.g., data structures) that enable network nodes of the EPC network to translate or map error codes into a format that is understandable by a MME of the EPC network and/or by UEs connected to the MME.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 7 and 8, the blocks and/or the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items and may be used interchangeably with one or more. Where only one item is intended, the term "one" or similar language is used. Further, the phrase "based on" is intended to mean "based, at least in part, on" unless explicitly stated otherwise.

What is claimed is:

1. A method, comprising:
   receiving, by a first node device associated with an evolved packet core network, an error code from a second node device associated with the evolved packet core network, the error code being destined for a user equipment;
   comparing, by the first node device, the error code to information included in a data structure that maps a plurality of error codes to a plurality of translated error codes understood by the user equipment;
   translating, by the first node device, the error code into a translated error code based on comparing the error code to the information included in the data structure,
   the translated error code being in a format that is understood by the user equipment,
   translating the error code including:
   translating the error code into the translated error code based on:
   an error code type provided in the data structure,
   an error code trigger provided in the data structure, and
   a desired behavior of the user equipment as defined in the data structure; and
   providing, by the first node device, the translated error code to the user equipment or to a third node device associated with the evolved packet core network.

2. The method of claim 1, where providing the translated error code includes:
   providing the translated error code to the third node device to cause the third node device to forward the translated error code to the user equipment.

3. The method of claim 1, where the data structure defines standards for translating error codes at an interface connecting the first node device and the second node device.

4. The method of claim 1, where translating the error code into the translated error code further comprises:
   translating the error code into the translated error code further based on:
   an error code description provided in the data structure, and
   an error code message type provided in the data structure.

5. The method of claim 1, where the error code is associated with an outage in the evolved packet core network.

6. The method of claim 1, where the first node device includes one of:
   a mobility management entity (MME),
   a serving gateway (SGW), or
   a packet data network (PDN) gateway (PGW).

7. The method of claim 6, where the second node device includes one of:
   a serving gateway (SGW),
   a packet data network (PDN) gateway (PGW),
   a home subscriber server (HSS),
   an equipment identity register (EIR), or
   an authentication, authorization, and accounting (AAA) server.

8. A first node device associated with an evolved packet core network, the first node device comprising:
   a processor to:
   receive an error code from a second node device associated with the evolved packet core network,
   the error code being destined for a user equipment,
   compare the error code to information included in a data structure that maps a plurality of error codes to a plurality of translated error codes in a format that is understood by the user equipment,
   the data structure including:
   an error code trigger,
   an error code message type, and
   information identifying a desired behavior of the user equipment,
   translate the error code into a translated error code based on comparing the error code to the information included in the data structure,
   the translated error code being in the format that is understood by the user equipment, and
   provide the translated error code to the user equipment or to a third node device associated with the evolved packet core network.

9. The first node device of claim 8, where, when providing the translated error code, the processor is to:
   provide the translated error code to the third node device to cause the third node device to forward the translated error code to the user equipment.

10. The first node device of claim 8, where the data structure defines standards for translating error codes at an interface connecting the first node device and the second node device.

11. The first node device of claim 8, where, when translating the error code into the translated error code, the processor is further to:
translate the error code into the translated error code based on an error code type provided in the data structure,
translate the error code into the translated error code based on an error code description provided in the data structure,
translate the error code into the translated error code based on the error code trigger provided in the data structure,
translate the error code into the translated error code based on the error code message type provided in the data structure, and
translate the error code into the translated error code based on the information identifying the desired behavior of the user equipment as defined in the data structure.

12. The first node device of claim 8, where the error code is associated with an outage in the evolved packet core network.

13. The first node device of claim 8, where the first node device includes one of:
a mobility management entity (MME),
a serving gateway (SGW), or
a packet data network (PDN) gateway (PGW).

14. The first node device of claim 13, where the second node device includes one of:
a serving gateway (SGW),
a packet data network (PDN) gateway (PGW),
a home subscriber server (HSS),
an equipment identity register (EIR), or
an authentication, authorization, and accounting (AAA) server.

15. A non-transitory computer-readable medium storing instructions, the instructions comprising:
one or more instructions that, when executed by one or more processors of a first node device associated with an evolved packet core network, cause the one or more processors to:
receive an error code from a second node device associated with the evolved packet core network,
the error code being destined for a user equipment,
compare the error code to information stored in a data structure that maps a plurality of error codes to a plurality of translated error codes understood by the user equipment,
the data structure including:
an error code type,
an error code trigger, and
information identifying a desired behavior of the user equipment, translate the error code into a translated error code based on comparing the error code to the information stored in the data structure,
the translated error code being in a format that is understood by the user equipment, and
provide the translated error code to the user equipment or to a third node device associated with the evolved packet core network.

16. The non-transitory computer-readable medium of claim 15, where the one or more instructions to provide the translated error code include:
one or more instructions to provide the translated error code to the third node device to cause the third node device to forward the translated error code to the user equipment.

17. The non-transitory computer-readable medium of claim 15, where the data structure defines standards for translating error codes at an interface connecting the first node device and the second node device.

18. The non-transitory computer-readable medium of claim 15, where the data structure further includes:
an error code description, and
an error code message type.

19. The non-transitory computer-readable medium of claim 15, where the first node device includes one of:
a mobility management entity (MME),
a serving gateway (SGW), or
a packet data network (PDN) gateway (PGW).

20. The non-transitory computer-readable medium of claim 15, where the second node device includes one of:
a serving gateway (SGW),
a packet data network (PDN) gateway (PGW),
a home subscriber server (HSS),
an equipment identity register (EIR), or
an authentication, authorization, and accounting (AAA) server.

* * * * *